US011300192B2

(12) United States Patent
Staples

(10) Patent No.: US 11,300,192 B2
(45) Date of Patent: Apr. 12, 2022

(54) CHAINRING FOR A BICYCLE

(71) Applicant: D3 Innovation Inc., Squamish (CA)

(72) Inventor: Jonathan Staples, Garibaldi Highlands (CA)

(73) Assignee: D3 Innovation Inc.

( * ) Notice: Subject to any disclaimer, the term of this patent is extended or adjusted under 35 U.S.C. 154(b) by 0 days.

(21) Appl. No.: 16/697,720

(22) Filed: Nov. 27, 2019

(65) Prior Publication Data

US 2020/0166114 A1    May 28, 2020

Related U.S. Application Data

(60) Provisional application No. 62/772,209, filed on Nov. 28, 2018, provisional application No. 62/846,854, filed on May 13, 2019.

(51) Int. Cl.
*F16H 55/30* (2006.01)
*B62M 9/02* (2006.01)
*B62M 9/00* (2006.01)

(52) U.S. Cl.
CPC ............ *F16H 55/30* (2013.01); *B62M 9/02* (2013.01); *B62M 2009/005* (2013.01)

(58) Field of Classification Search
CPC .......... F16H 55/30; F16H 7/06; F16H 55/303; B62M 9/105; B62M 9/10
USPC .................................................. 474/152, 156
See application file for complete search history.

(56) References Cited

U.S. PATENT DOCUMENTS

| 586,991 | A | * | 7/1897 | Curley | .................... | F16H 55/30 |
| | | | | | | 474/156 |
| 3,969,947 | A | * | 7/1976 | Martin | .................... | F16H 55/30 |
| | | | | | | 474/156 |
| 4,174,642 | A | * | 11/1979 | Martin | .................... | F16H 55/30 |
| | | | | | | 474/152 |
| 7,824,287 | B2 | * | 11/2010 | Nonoshita | ................ | B62M 9/10 |
| | | | | | | 474/161 |
| D715,699 | S | * | 10/2014 | Reiter | ..................... | F16H 55/30 |
| | | | | | | D12/123 |
| D716,191 | S | * | 10/2014 | Reiter | ................... | F16H 55/303 |
| | | | | | | D12/123 |
| 8,888,631 | B2 | * | 11/2014 | Morita | .................... | F16H 55/30 |
| | | | | | | 474/153 |
| 9,062,758 | B2 | * | 6/2015 | Reiter | .................... | F16H 55/30 |
| 9,086,138 | B1 | * | 7/2015 | Emura | ....................... | F16H 7/06 |
| 9,182,027 | B2 | * | 11/2015 | Reiter | ................... | B62M 9/105 |
| 9,291,250 | B2 | | 3/2016 | Reiter et al. | | |
| 9,316,302 | B2 | * | 4/2016 | Braedt | .................... | F16H 55/30 |

(Continued)

*Primary Examiner* — Henry Y Liu
(74) *Attorney, Agent, or Firm* — Kevin Shipley; Fogler, Rubinoff LLP

(57) ABSTRACT

A bicycle chainring may have a plurality of first teeth that fit within the narrow link spaces in a drive chain, and a plurality of second teeth that fit within the wide link spaces in a drive chain. Each second tooth may have a first width that is greater than the its tip width at a location that is between about 40% and about 60% of the tooth height and a second width that is greater than the first width and is between the first plane and the root. A first transition portion may be on a first side of the second tooth and may extends between a first edge that is at the tip and extends in an edge direction that is substantially parallel to the central plane and a second edge that is disposed at the second plane and extends in the edge direction.

20 Claims, 14 Drawing Sheets

(56) References Cited

U.S. PATENT DOCUMENTS

| | | | |
|---|---|---|---|
| 9,394,986 B2 * | 7/2016 | Pfeiffer | B62M 9/105 |
| 9,394,987 B2 * | 7/2016 | Pfeiffer | F16H 55/30 |
| 9,404,565 B2 * | 8/2016 | Pfeiffer | F16H 55/30 |
| 9,493,211 B2 | 11/2016 | Reiter et al. | |
| 9,581,229 B2 * | 2/2017 | Pfeiffer | F16H 55/30 |
| 9,581,230 B2 * | 2/2017 | Pfeiffer | F16H 55/30 |
| 9,581,231 B2 * | 2/2017 | Pfeiffer | F16H 55/30 |
| 9,625,027 B2 * | 4/2017 | Pfeiffer | F16H 55/30 |
| 9,650,107 B2 | 5/2017 | Reiter et al. | |
| 9,701,364 B2 * | 7/2017 | Sugimoto | B62M 9/105 |
| 9,719,590 B2 * | 8/2017 | Reiter | F16H 55/30 |
| 9,731,790 B2 | 8/2017 | Reiter et al. | |
| 9,731,791 B2 | 8/2017 | Reiter et al. | |
| 9,873,481 B2 * | 1/2018 | Braedt | B62M 9/10 |
| 9,964,196 B2 * | 5/2018 | Sugimoto | F16H 55/30 |
| 10,247,291 B2 * | 4/2019 | Akanishi | B62M 9/00 |
| 10,295,041 B2 * | 5/2019 | Akanishi | B62M 9/12 |
| 10,359,106 B2 * | 7/2019 | Akanishi | F16H 55/30 |
| 10,378,637 B2 * | 8/2019 | Ooishi | B62M 9/10 |
| 10,451,166 B2 * | 10/2019 | Winans | F16G 13/06 |
| 10,577,050 B2 * | 3/2020 | Akanishi | B62M 9/10 |
| 10,578,201 B2 * | 3/2020 | Reiter | B62M 9/00 |
| 2006/0258498 A1 * | 11/2006 | Tabe | B62M 9/105 474/160 |
| 2007/0054768 A1 * | 3/2007 | Miyazawa | F16H 55/30 474/152 |
| 2017/0305498 A1 | 10/2017 | Reiter et al. | |

\* cited by examiner

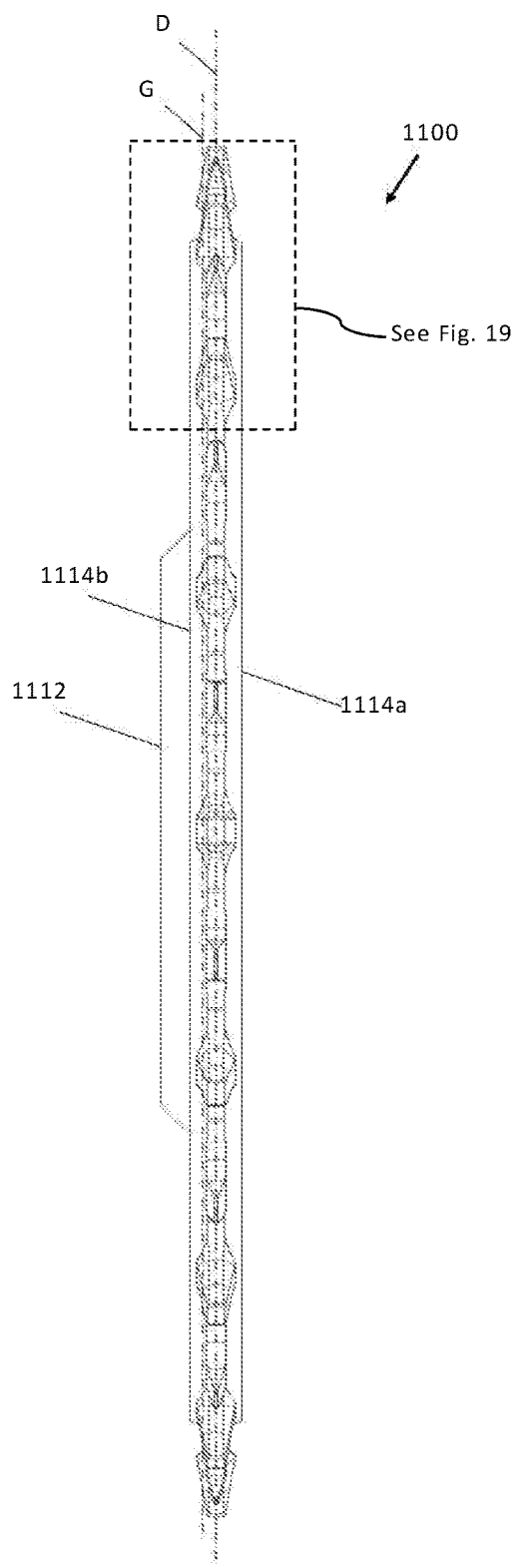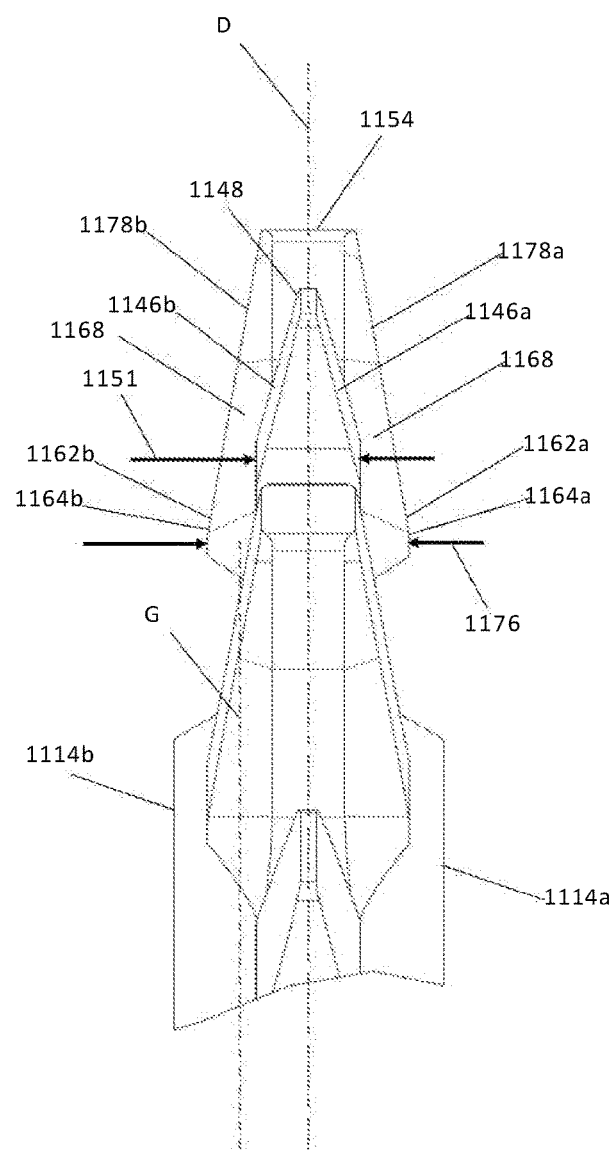
FIG. 18
FIG. 19

CHAINRING FOR A BICYCLE

CROSS-REFERENCE TO RELATED APPLICATIONS

The present application claims the benefit under 35 U.S.C. § 138(e) of U.S. provisional patent application No. 62/772,209 filed on Nov. 28, 2018 and U.S. provisional patent application No. 62/846,854 filed on May 13, 2019, each of which is hereby incorporated herein in its entirety.

FIELD OF THE INVENTION

This invention relates to bicycle chainrings, and more specifically, to front chainrings for use with a bicycle crankset and bicycle chain having alternating narrow and wide link spacings.

BACKGROUND

U.S. Pat. No. 9,731,790 describes a bicycle chainring includes a plurality of teeth extending from a periphery of the chainring wherein roots of the plurality of teeth are disposed adjacent the periphery of the chainring. The plurality of teeth include a first group of teeth and a second group of teeth, each of the first group of teeth wider than each of the second group of teeth, and at least some of the second group of teeth arranged alternatingly and adjacently between the first group of teeth, wherein the center of a top land of at least some of the first and second groups of teeth are offset from a plane in a direction toward one of the inboard and outboard sides of the chainring.

U.S. Pat. No. 4,174,642 describes a chain drive that includes a sprocket rotatable in a plane and comprising an even number of wide and narrow tapered teeth and a flexible chain comprising successive links having alternate wide and narrow tooth-engaging link openings, with tooth width and link-opening width being measured in a direction transverse to the plane of sprocket rotation. The arrangement ensures proper registration and engagement of the link opening of each oncoming link with a tooth of appropriate width despite displacement of the oncoming chain flight from the plane of sprocket rotation and thereby prevents disengagement of a loose chain from the sprocket or breakage of a tight chain by the sprocket.

U.S. Pat. No. 9,731,790 describes a bicycle chainring that includes a plurality of teeth extending from a periphery of the chainring wherein roots of the plurality of teeth are disposed adjacent the periphery of the chainring. The plurality of teeth include a first group of teeth and a second group of teeth, each of the first group of teeth wider than each of the second group of teeth, and at least some of the second group of teeth arranged alternatingly and adjacently between the first group of teeth, wherein the center of a top land of at least some of the first and second groups of teeth are offset from a plane in a direction toward one of the inboard and outboard sides of the chainring.

SUMMARY

Modern bicycles typically use one front chainring and may employ various devices to help stop chain derailment including chain guides and tensioners.

Chain retention is especially important in off-road cycling where the chain moves considerably up/down and side-to-side when traveling on rough terrain.

Avoiding chain derailment in off-road cycling is therefore a concern from a performance standpoint as inopportune derailment could cause a crash or cause a bicycle rider to lose a race. One solution to this problem has been to create chainrings that have alternating wide and narrow teeth so that the teeth a more closely matched in width with the distance between alternating wide and narrow link spacing of a typical bicycle chain. It has generally been thought that configuring the teeth to fill at least 80% of the width of the respective link space can help reduce misalignment, and that both the skinny and wide teeth should have a relatively short, tapered section to help urge the chain quickly into alignment with the chainring.

For example, U.S. Pat. No. 9,291,250 discloses an alternating wide narrow tooth arrangement wherein a maximum axial width of the wide teeth is provided at a location that is about halfway between a root circle and a top land of the wide group of teeth (e.g. about 50% of the distance from root to top land) so that the tooth fills at least 80 percent of an axial distance defined by the outer link spaces at this location. Similarly, U.S. Pat. No. 4,174,642 illustrates an alternating wide narrow tooth arrangement wherein a maximum axial width at toward the midpoint of the tooth height and fills about 85 percent of an axial distance defined by the outer link spaces. This patent also shows an outer link retaining face (53) that is only approximately 40 percent of the length of the wide tooth at a position close to the tooth root. In these designs the wide teeth widen from their tip to about their midpoint, at which point they have reached their maximum width and then maintain substantially the same width until reaching their root.

It has been noticed by the inventor that filling 80 percent of the outer link space this close to the tooth tip can cause a relatively abrupt realignment or the chain, which can be undesirable. For example, such an abrupt realignment may contribute to relatively higher wear on the chainring and loss of pedaling efficiency due to high outer chain link side loads and friction. These known chainrings also typically have multiple faces or surfaces that will contact and engage with the link plates of the chain as it settles radially onto the tooth. When acting to re-align a misaligned chain, the link plates of the chain will bear against and slide along these different faces of the chainring teeth, as well as grinding against the transitions/edges between the teeth bearing surfaces. This engagement produces friction as the chain is brought back into alignment which can contribute to relatively high wear at the transitions between adjacent tooth bearing tooth faces. Over time, this can wear down the chain-engaging portions of the wide teeth relatively quickly, which can result in the teeth becoming less effective at re-aligning the chain.

It was also noticed that because of the relatively abrupt widening of the wide teeth that the surfaces that engage and contact the link plates of the chain are relatively small and are inclined at relatively steep angles relative to a central plane of the chainring. In this arrangement, the forces transmitted by the generally vertical and parallel chain link faces will tend to be applied to these relatively small tooth contact surfaces, which can help contribute to the accelerated wear of such surfaces as the misaligned chain is brought back into alignment resulting in high wear during transition from face to face.

Therefore, despite the existence of some examples of a chainring that has alternating narrow and wide teeth there remains a need for an improved version of a chain ring that may help to address some of the shortcomings noted herein, and optionally may include a new wide tooth design.

The foregoing examples of the related art and limitations related thereto are intended to be illustrative and not exclusive. Other limitations of the related art will become apparent to those of skill in the art upon a reading of the specification and a study of the drawings.

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

One aspect of the teachings described herein provides an alternating wide narrow bicycle chainring wherein the entirety of the wide tooth inner and outer link engaging faces are formed as a single plane or a constant radius curve and converge towards to tooth tip.

One aspect of the teachings described herein provides an alternating wide narrow bicycle chainring wherein a maximum axial width about halfway between a root circle and a top land of the wide group of teeth fills less than 80 percent of an axial distance defined by the outer link spaces and wherein a maximum axial width adjacent the root is at least 90 percent of an axial distance defined by the outer link spaces One aspect of the teachings described herein provides an alternating wide narrow bicycle chainring wherein the wide tooth inner and outer link engaging faces also define the tooth tip chamfer on the narrow teeth.

One aspect of the teachings described herein provides an alternating wide narrow bicycle chainring wherein the wide tooth top land and the narrow tooth top land are the same width.

One aspect of the teachings described herein provides an alternating wide narrow bicycle chainring wherein the wide and narrow tooth tips are centered between planes defined by the inner and outer faces of the narrow teeth.

One aspect of the teachings described herein provides an alternating wide narrow bicycle chainring wherein the wide and narrow tooth tips are centered between planes defined by the inner and outer faces of the wide teeth.

One aspect of the teachings described herein provides an alternating wide narrow bicycle chainring wherein the wide and narrow tooth tips are centered between planes defined by the inner and outer faces of the chainring at a location adjacent the outer periphery.

One aspect of the teachings described herein provides an alternating wide narrow bicycle chainring wherein the wide and narrow tooth tips are offset closer to a plane defined by the inner face of the chainring at a location adjacent the outer periphery than to a plane defined by a mounting face adjacent to the chainring axis.

One aspect of the teachings described herein provides an alternating wide narrow bicycle chainring wherein the wide teeth are symmetric about a plane that is parallel to the chainring rotation axis and bisects the wide tooth top land.

One aspect of the teachings described herein provides an alternating wide narrow bicycle chainring wherein the narrow teeth are symmetric about a plane that is parallel to the chainring rotation axis and bisects the narrow tooth top land.

One aspect of the teachings described herein provides an alternating wide narrow bicycle chainring wherein the width directly adjacent to and below the root periphery is narrower than both the wide and narrow teeth.

The teachings described herein may, in one broad aspect, relate to a bicycle chainring for engagement with a drive chain having alternating narrow link spaces and wide link spaces. That chainring may include a) a body having a mounting portion that may be connected to a bicycle and a periphery. The body may be rotatable about a drive axis when connected to the bicycle and may define a central plane that is orthogonal to the drive axis. A plurality of first teeth may be spaced apart from each other around the periphery and may extend radially outwardly from the periphery and may be configured to fit within the narrow link spaces in the drive chain. A plurality of second teeth may be disposed alternatingly between adjacent ones of the first teeth around the periphery and may be configured to fit within the wide link spaces in the drive chain. Each second tooth may extend radially from a root adjacent the periphery to a tip that is spaced from the root by a tooth height and may have a tip width in the axial direction. Each second tooth may have i) a first width that is greater than the tip width and is measured orthogonally to the radial direction in a first plane that is disposed between about 40% and about 60% of the tooth height and ii) a second width that is greater than the first width and is measured orthogonally to the radial direction in a second plane that is disposed radially between the first plane and the root. A first transition portion may be provided on a first side of the second tooth and may be at least partially bounded by and extend between a first edge that is at the tip and extends in an edge direction that is substantially parallel to the central plane and a second edge that is disposed at the second plane and extends in the edge direction. The first and second planes may intersect the first transition portion.

Other aspects of the teachings described herein, which may be used in combination with any other aspect, including the broad aspect listed above, may include that each second tooth of the bicycle chain ring further comprises a second transition portion on an opposing second side of the second tooth that is at least partially bounded by and extends between a first edge that is at the tip and extends in the edge direction and a second edge that is disposed at the second plane and extends in the edge direction, the first and second planes intersecting the second transition portion.

The first plane may be disposed at about 50% of the tooth height.

The first width may be less than about 80% of a width of the wide link spaces.

The second width may be at least 110% of the first width.

The second width may be at least about 120% and/or about 125% of the first width.

Each second tooth may be configured so that the second width is between about 95% and about 105% of a width of the wide link spaces.

The second plane may be disposed between about 10% and about 30% and/or about 40% of the tooth height and may preferably be disposed at about 25% of the tooth height.

The second plane may be positioned so that the second plane is disposed radially below or inwardly and does not intersect opposing active link surfaces of the drive chain that bound the wide link spaces when the second tooth is fully received within a corresponding one of the wide link spaces.

Each second tooth may generally widen from the tip to the second plane.

The first transition portion of the bicycle chainring may comprise a first transition surface that extends continuously between the first edge and the first plane.

The first transition surface may extend continuously between the first edge and the second plane.

The first transition surface may have a first chamfer surface and may be substantially planar and inclined relative to the central plane.

The first transition surface may have an arcuate, convex first fillet surface.

The first fillet surface may have a constant radius of curvature.

The first side of each second tooth may further comprise a first edge surface intersecting with the second edge of the first transition portion and extending away from the first transition portion and parallel to the central plane.

The first transition surface may have a transition height in the radial direction and the inboard edge surface has an edge height in the radial direction that is between about 5% and about 15% of the transition height.

The second width may define the widest extent of the second tooth.

Each second tooth may comprise a top land surface that extends axially and defines the tip width.

The first width may be less than about 3.0 mm and the second width may be between about 3.4 and about 4.2 mm Each second tooth may include a third width measured orthogonally to the radial direction in a third plane that is disposed between the second plane and the root and that may be less than the second width.

The third width may be less than the first width.

The third width may be the same as a root width of the roots of the first teeth.

The teachings described herein may, in another broad aspect, relate to a bicycle chainring for engagement with a drive chain having alternating narrow link spaces and wide link spaces. The chain ring may include a body having a mounting portion configured to be connected to a bicycle and a periphery. The body may be rotatable about a drive axis when connected to the bicycle. A plurality of first teeth spaced may be apart from each other around the periphery, extend radially outwardly from the periphery, and may be configured to fit within the narrow link spaces in the drive chain. A plurality of second teeth may be disposed alternatingly between adjacent ones of the first teeth around the periphery and may be configured to fit within the wide link spaces in the drive chain. Each second tooth may extend radially from a root adjacent the periphery to a tip that is spaced from the root by a tooth height and has a tip width in the axial direction. Each second tooth may have a first width measured orthogonally to the radial direction in a first plane that is disposed between about 40% and about 60% of the tooth height and that is greater than the tip width and is less than 80% of a link width of the wide link spaces, and a second width measured orthogonally to the radial direction in a second plane that is disposed radially between the first plane and the root and that is at least 95% of the link width.

Other aspects of the teaching described herein, which may be used in combination with any other aspect, including the broad aspect listed above, may include that each second tooth has a first transition portion on a first side of the second tooth that is at least partially bounded by and extends between a first edge that is at the tip and extends in an edge direction that is substantially parallel to the central plane and a second edge that is disposed at the second plane and extends in the edge direction. The first and second planes may intersect the first transition portion.

Each second tooth may have a second transition portion on an opposing second side of the second tooth that is at least partially bounded by and extends between a first edge that is at the tip and extends in the edge direction and a second edge that is disposed at the second plane and extends in the edge direction. The first and second planes may intersect the second transition portion.

The first plane may be disposed at about 50% of the tooth height.

The second width may be at least 110% of the first width.

The second width may be at least about 120% and/or about 125% of the first width.

Each second tooth may be configured so that the second width is between about 95% and about 105% of a width of the wide link spaces.

The second plane may be disposed between about 10% and about 30% of the tooth height and may preferably be disposed at about 25% of the tooth height.

The second plane may be positioned so that the second plane is disposed radially below and does not intersect opposing active link faces of the drive chain that bound the wide link spaces when the second tooth is fully received within a corresponding one of the wide link spaces.

Each second tooth may generally widen from the tip to the second plane.

The first transition portion may include a first transition surface that extends continuously between the tip and the first plane.

The first transition surface may extend continuously between the tip and the second plane.

The first transition surface may include a first chamfer surface and may be substantially planar and inclined relative to the central plane.

The first transition surface may include an arcuate, convex first fillet surface.

The first fillet surface may include a constant radius of curvature.

Each second tooth may include an inboard edge surface intersecting the second edge of the first transition surface at the second plane and extending parallel to the radial direction from the second plane.

The first transition surface may have a transition height in the radial direction and the inboard edge surface may have an edge height in the radial direction that is between about 5% and about 15% of the transition height.

The second width may define the widest extent of the second tooth.

Each second tooth may comprise a top land surface that extends axially and defines the tip width.

The first width may be less than about 3.0 mm and the second width may be between about 3.4 and about 4.2 mm.

Each second tooth may have a third width measured orthogonally to the radial direction in a third plane that is disposed between the second plane and the root and that may be less than the second width.

The third width may be less than the first width.

The third width may be the same as a root width of the roots of the first teeth.

The teachings described herein may, in one broad aspect, relate to a bicycle chainring for engagement with a drive chain having alternating narrow link spaces and wide link spaces. The chainring may include a body having a mounting portion configured to be connected to a bicycle and a periphery. The body may be rotatable about a drive axis when connected to the bicycle. A plurality of first teeth may be spaced apart from each other around the periphery, extend radially outwardly from the periphery, and may be configured to fit within the narrow link spaces in the drive chain. A plurality of second teeth may be disposed alternatingly between adjacent ones of the first teeth around the periphery and may be configured to fit within the wide link spaces in the drive chain. Each second tooth may extend radially from a root adjacent the periphery to a tip that is spaced from the root by a tooth height and may have a tip width in the axial direction. Each second tooth may have a first width measured orthogonally to the radial direction in a first plane that is disposed at about 50% of the tooth height and that is greater than the tip width and a second width measured orthogonally to the radial direction in a second plane that is disposed radially between the first plane and the root and is disposed radially below and does not intersect opposing active link faces of the drive chain that bound the wide link spaces when the second tooth is fully received within a respective one of the wide link spaces. The second width may be greater than the first width. Each second tooth may widen continuously from the tip to the second plane.

Other aspects of the teachings described herein, which may be used in combination with any other aspect, including the broad aspect listed above, may include a first transition portion on a first side of the second tooth that is at least partially bounded by and extends between a first edge that is at the tip and extends in an edge direction that is substantially parallel to the central plane and a second edge that is disposed at the second plane and extends in the edge direction, the first and second planes intersecting the first transition portion.

There may further be a second transition portion on an opposing second side of the second tooth that is at least partially bounded by and extends between a first edge that is at the tip and extends in the edge direction and a second edge that is disposed at the second plane and extends in the edge direction, the first and second planes intersecting the second transition portion.

BRIEF DESCRIPTION OF THE DRAWINGS

FIG. 18 is a front view of the chainring of FIG. 14;

FIG. 19 is an enlarged view of a portion of FIG. 18;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
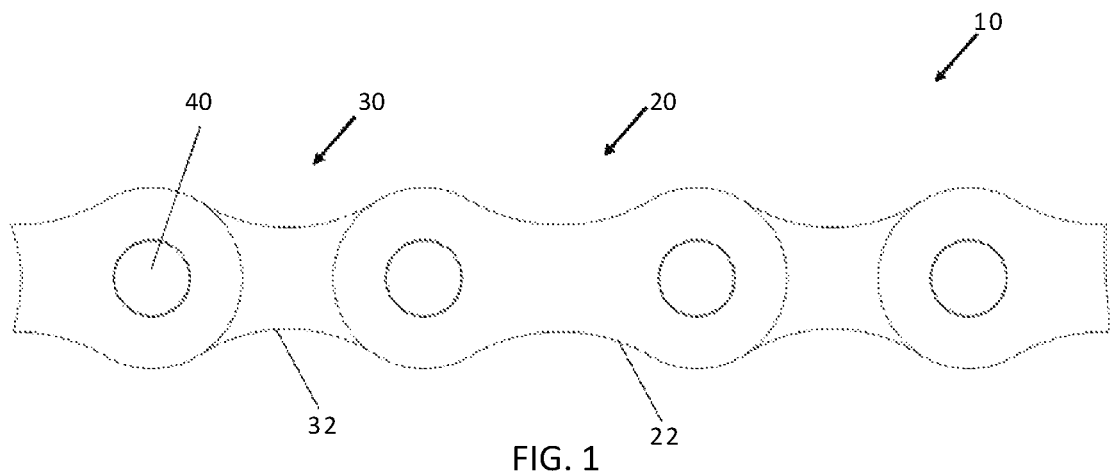
FIG. 1 is a side view of a portion of one example of a bicycle drive chain.
Figure 2:
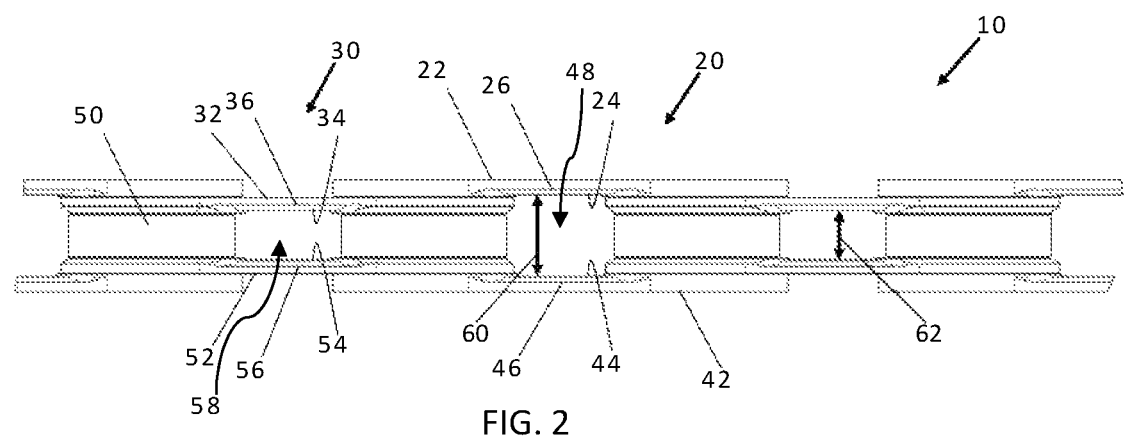
FIG. 2 is a top view of the bicycle drive chain of FIG. 1.
Figure 3:
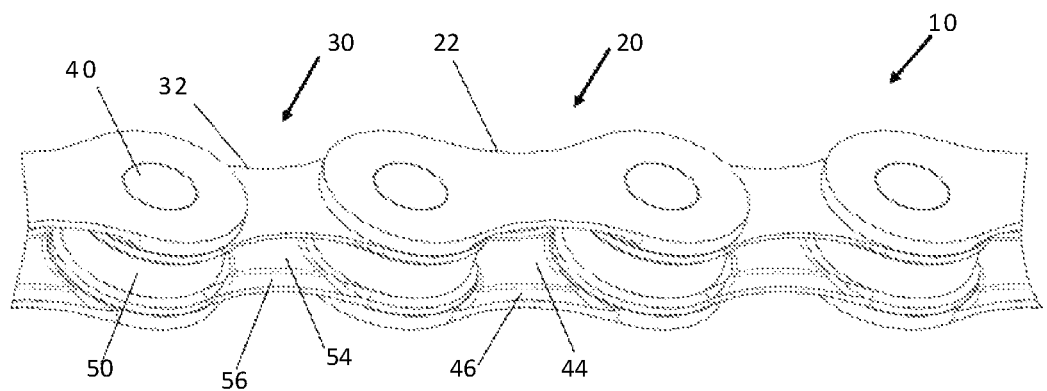
FIG. 3 is a lower perspective view of the bicycle drive chain of FIG. 1.
Figure 4:
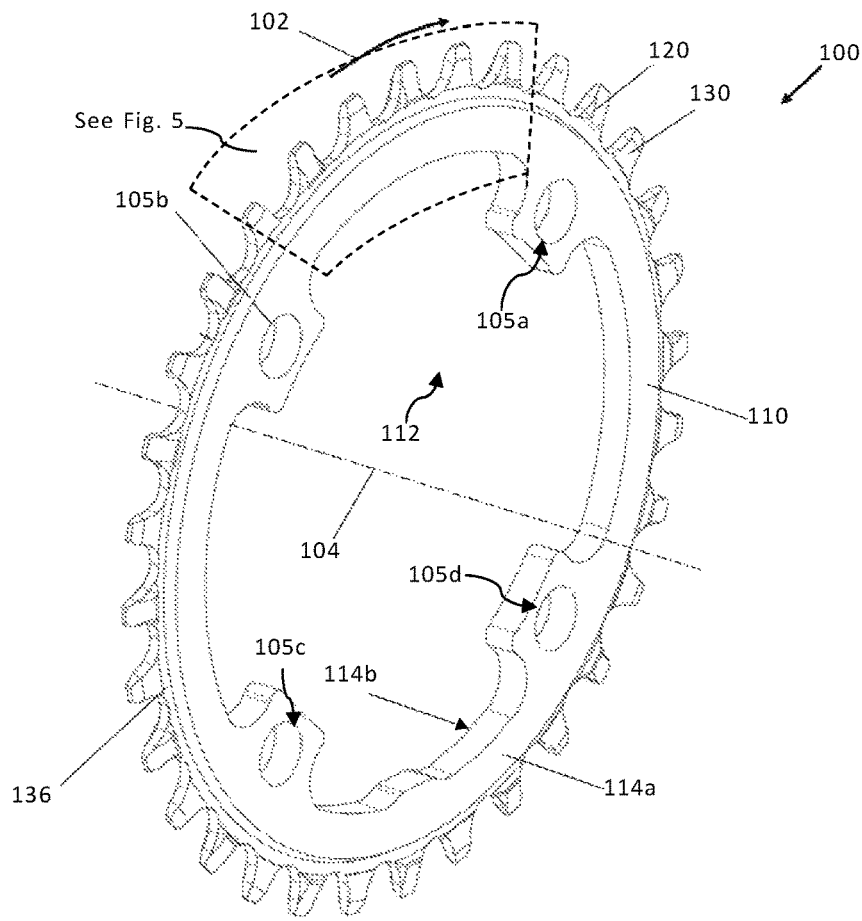
FIG. 4 is a perspective view of one example of a chainring.

Referring to FIGS. 1 to 3, one example of a drive chain 10 as contemplated for engagement with a bicycle chainring is shown to help illustrate some of the features of the chainrings described herein. This example of a drive chain is intended to be illustrative only, and in this example the drive chain 10 includes a number of outer link pairs 20, inner link pairs 30, pins 40 and rollers 50. Other chain configurations may be used on a given bicycle and may be generally compatible with the examples of the chainrings described herein.

In this example, the outer link set 20 includes an outboard link 22 and an inboard link 42 that bound a wide link space 48 that can receive a tooth from a chainring. The distance between these links 22 and 42 (in a direction that is substantially orthogonal to the direction in which the chain moves) defines a wide link width 60. In this example, the outboard link 22 and inboard link 42 have respective inner faces 44 and 24 as well as inner lead-in chamfers 46 and 26.

Similarly, the inner link set 30 includes an outboard link 32 and an inboard link 52 that bound and a narrow link space 58 that can receive a tooth from a chainring. The distance between these links 32 and 52 (in a direction that is substantially orthogonal to the direction in which the chain moves) defines a narrow link width 62. Outboard link 32 and inboard link 52 also include respective inner faces 54 and 34 as well as inner lead-in chamfers 56 and 36. The inner faces of the chain links, such as faces 24 and 44, and 34 and 54 can also be described as the active link faces of the chain as they are the faces that will tend to come into contact with the teeth on a corresponding chainring, and that may tend to bear against the chainring teeth when the chain is subjected to lateral forces and/or has become slightly misaligned.

In this description, references to inboard and outboard are used with reference to the usual position and orientation of the chain and/or chainring relative to the frame of a bicycle to which they are attached. Unless specified, objects that are generally symmetrical may be oriented relative to the bicycle frame in two different orientations and the identification of the features as either inboard or outboard is for ease of description and is not a restriction on how the object may ultimately be mounted or used. That is, a link that is described as an outboard link in FIG. 2 may in fact become an inboard link when the chain is mounted to a bicycle in a different orientation, without materially altering how the chainring and chain engage with each other.

FIGS. 4-9 illustrate one example of a chainring 100 that can be attached to a bicycle crankset (not shown) and can be used to engage and drive the chain 10. When mounted to the bicycle and the crankset is pedaled the chainring 100 is configured so that it will rotate in a rotation direction 102 (shown as clockwise in FIG. 4, but which could also be counter clockwise) about a rotation axis 104.

Figure 10:
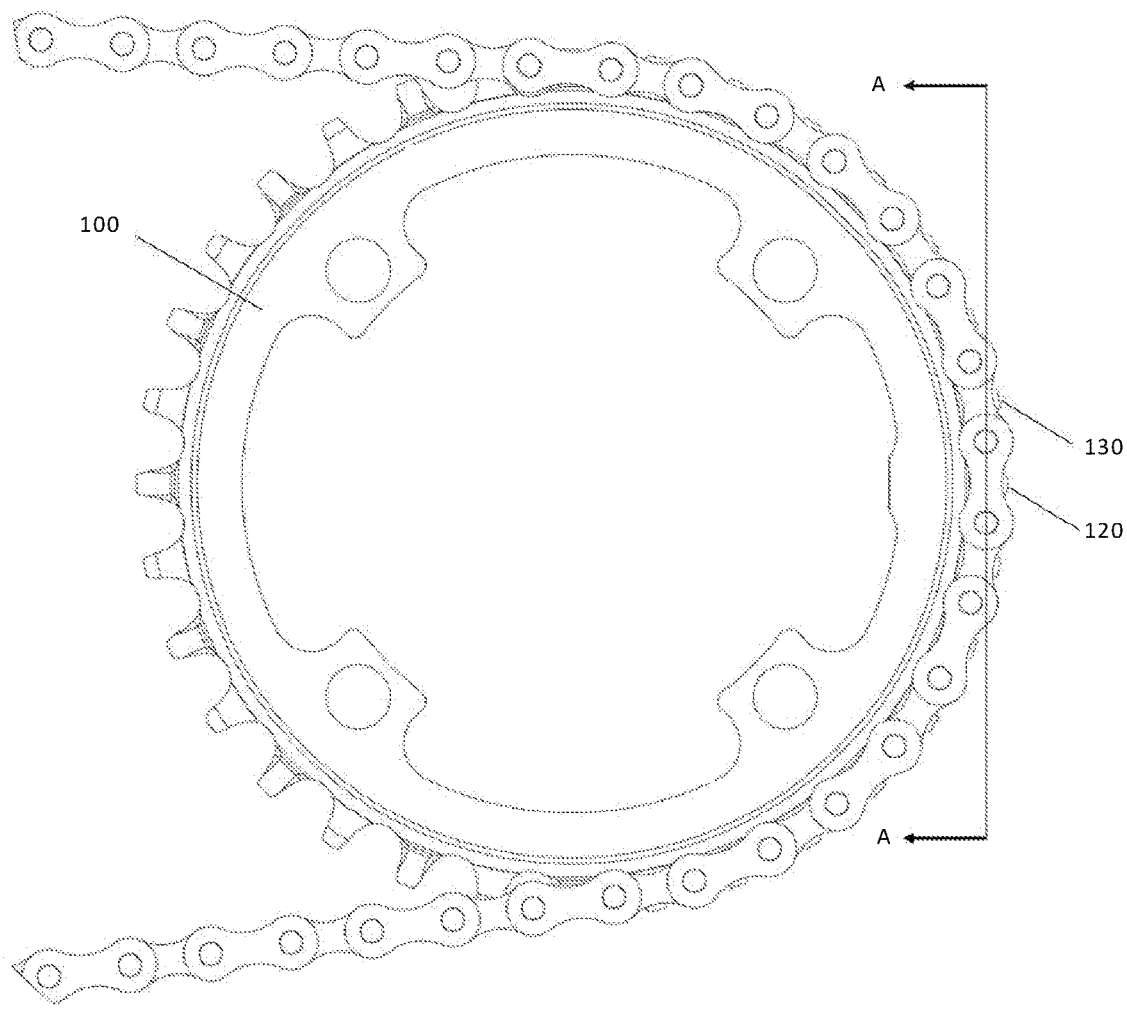
FIG. 10 is a side view of the chainring of FIG. 4 engage with a drive chain.

In this example, the chainring 100 includes body 110 and a mounting portion 112 that is configured to be connected to a bicycle. The body surrounds and is rotatable about the rotation axis 104 and helps define a plane D (FIG. 9) that is shown as being in the middle of the body 110 in the axial direction (i.e. parallel to rotation axis 104). The plane D is, in this example, substantially orthogonal or normal to and intersected by the rotation axis 104 and substantially bisects the body 110 in the axial direction. The thickness of portions of the chainring 100 when measured in a direction parallel to the rotation axis 104 is described as the width of such portions herein. When the chain 10 is seated on the chainring 100 (FIG. 10) the link widths 60 and 62 are substantially parallel to the width direction of the chainring. A radial direction is understood to mean the direction extending outwardly from the rotation axis 104, as shown using lines 108 in FIG. 6. For the purposes of discussion, the chainring 100 is described has having an outboard chainring face 114a and an opposing inboard chainring face 114b but it is understood that this orientation could be reversed if the chainring is connect to a bicycle in a different orientation.

Optionally, the mounting portion 112 may be of any configuration that is compatible with a bicycle crank set and may have different mounting hardware and configurations as desired. In this example, the mounting portion 112 includes a plurality of spaced apart mounting apertures 105a-105d that are sized to receive complimentary mounting bolts or other such fasteners. In other examples the mounting portion 112 may have a different configuration.

The chainring 100 also includes a periphery portion that surrounds the rotation axis 104. The periphery portion in the illustrated example includes an outer or root periphery region 116 and an inner periphery region 170 that is radially in inboard from the periphery region 116. In this example, the mounting portion 112 extends from the inner periphery region 170 and a plurality of teeth extend generally radially outwardly from the outer periphery region 116, including a plurality of wide teeth 120 arranged in an alternating manner with a plurality of relatively narrow teeth 130. In this example, the narrow teeth 130 all have substantially the same shape as each other, as do the wide teeth 120. In other examples, some of the teeth on the chainring 100 may have a different configuration while the chainring 100 could still be understood to include a plurality of wide and narrow teeth 120 and 130.

In this example, the narrow teeth 130 extend from respective roots 122 that are proximate the body 110 to respective tips 124 that are spaced apart from the roots 122 by a tooth height 126. The wide teeth 120 also extend from respective roots 128 proximate the body 110 to respective tips 132 that are spaced from the roots 128 by the wide tooth height 134. In the illustrated example the heights 126 and 134 are substantially equal, but in other examples may differ. Also, in this example the roots 122 and 128 of all of both types of teeth 120 and 130 lie along a common root groove 136 that is formed on the body 110 such that the roots 122 and 128 have substantially the same root width in the axial direction, one example of which is shown as root width 138 in FIG. 12.

Figure 11:
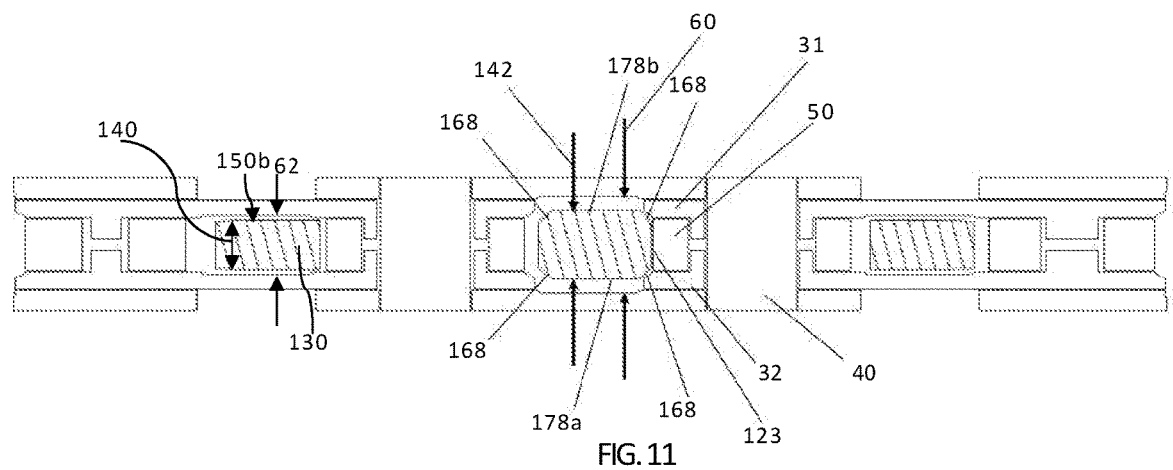
FIG. 11 is a cross-sectional view of the chainring and chain of FIG. 10, taken along line A-A.

Referring also to FIG. 11, the narrow teeth 130 are spaced apart from each other around the periphery 116 and are configured to fit within the narrow link spaces 58 in the drive chain 10, having a maximum width 140 that is less than the narrow link width 62. Also shown in FIG. 11, the wide teeth 120 are configured to fit within the wide link spaces 48 in the drive chain 10, such that the width 142 of the wide teeth 120, taken at the location of the section line A-A (e.g. in plane A of in FIG. 13), is less than the wide link width 60.

Referring again to FIGS. 5 and 7, the narrow teeth 130 in this example include drive faces 144 for driving a roller 50, an inboard chamfer surface 146a, an outboard chamfer surface 146b that converge toward a top land surface 148 and that help provide clearance when the tooth 130 is being inserted into the narrow chain space 58 and inboard and outboard side faces 150a and 150b that are generally radially oriented (i.e. generally parallel to plane D). The narrow teeth 130 can have a respective tip width 149 and a maximum width 151 (FIG. 9) that can be configured to fit within the narrow chain space 58.

Figure 12:
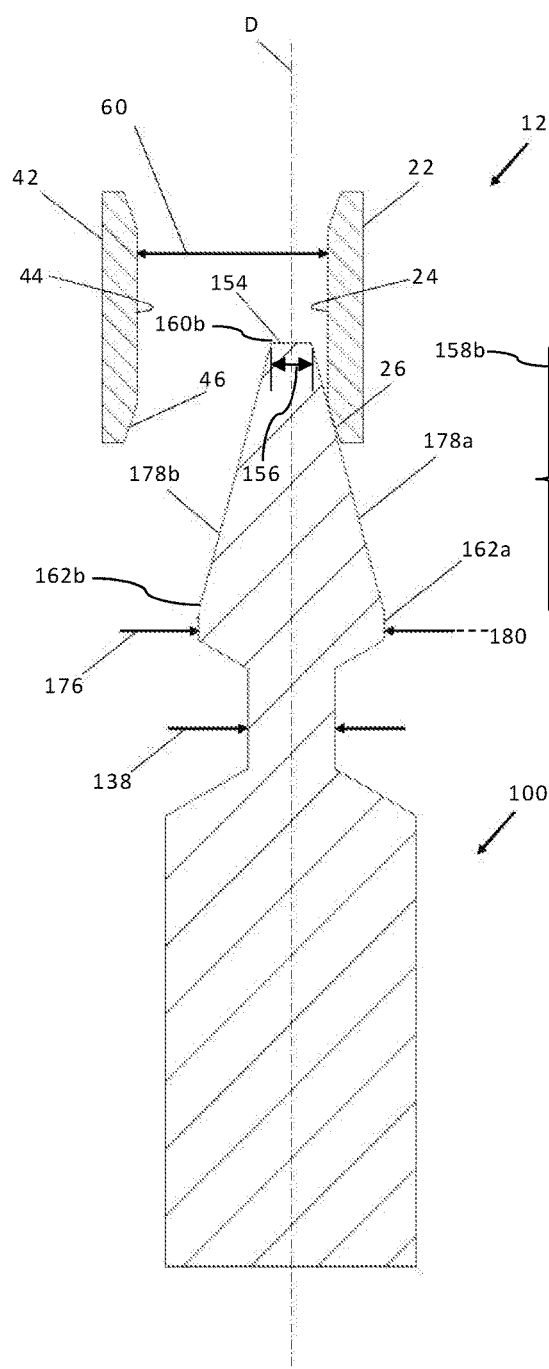
FIG. 12 is a schematic representation of a cross-sectional view of a portion of the chainring of FIG. 4 showing the drive chain partially engaged.
Figure 13:
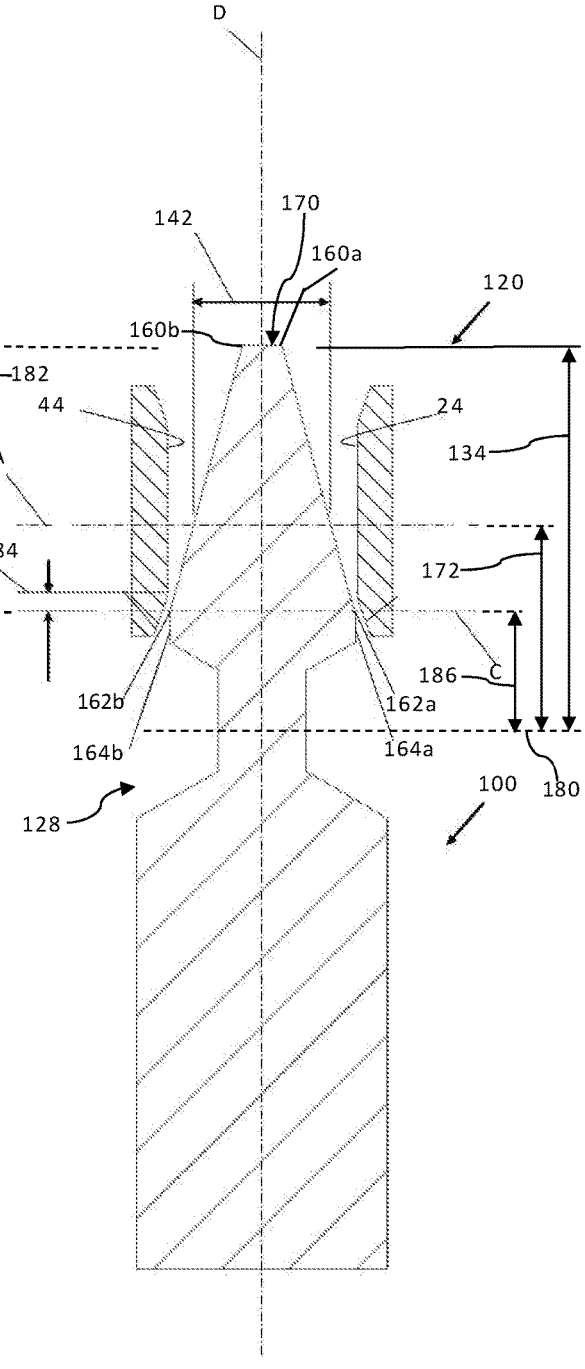
FIG. 13 is a schematic representation of a cross-sectional view of a portion of the chainring of FIG. 4 showing the drive chain engaged.
Figure 14:
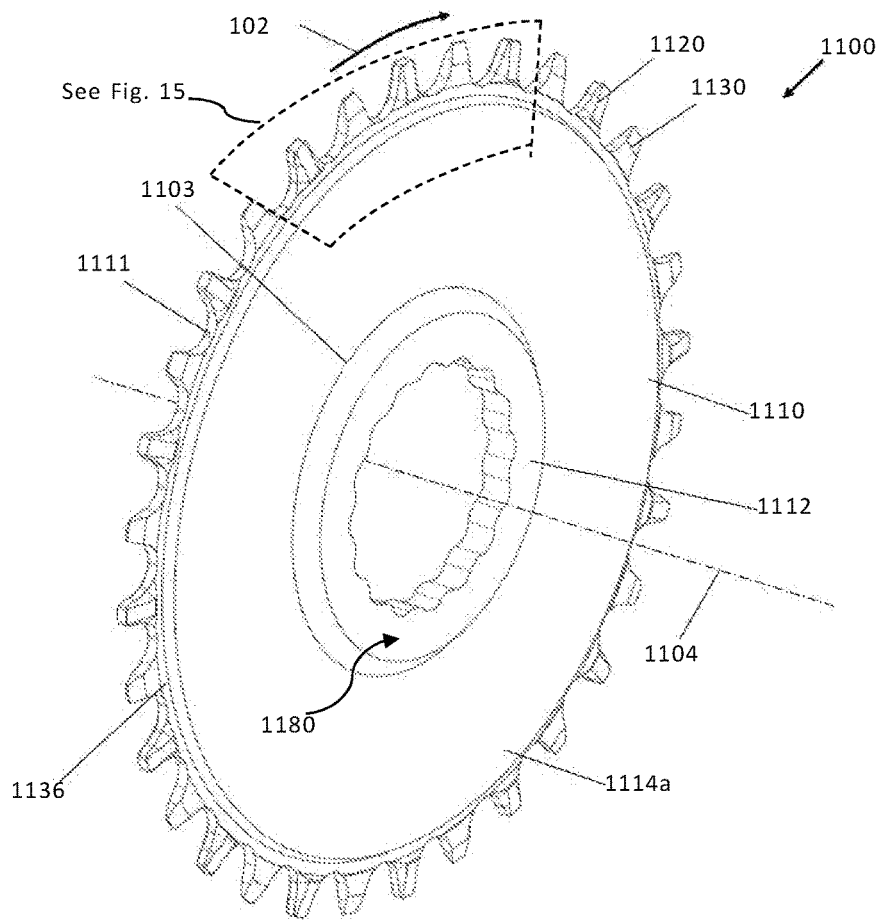
FIG. 14 is a perspective view of another example of a chainring.

Referring also to FIGS. 11-13, in this example, the wide teeth 120 include respective drive faces 152 for driving adjacent rollers 50 when in use and have a generally radially outwardly facing top land face 154 at is located at the tip 132 and defines a tip width 156 (FIG. 12). In this example, the tip width 156 is substantially the same as the tip width 149 of the narrow teeth 130, but these widths may be different in other embodiments.

The wide teeth 120 also include inboard and outboard transition portions 158a and 158b that extend from respective first or radially outer edges 160a and 160b to second or radially inner edges 162a and 162b. The radial distance between the edges 160 and 162 can define a transition portion height 182 (FIG. 13) that can be optionally be at least 55%, 65%, 70%, 75% or more of the tooth height 134. In some embodiments, the widening portion of the tooth (e.g. the transition portions 158) may be larger in the axial direction than the portions of the tooth that are either of generally constant width and/or portions of the tooth that taper inwardly (e.g. toward the root in this example. Each of the edges 160a,b and 162a,b are configured such that they extend in a direction that is substantially parallel to the plane D, which is understood to encompass edges that are linear and parallel to plane D, as well as edges like edges 160a,b and 162a,b which have a slight curvature in the radial direction but are substantially parallel to plane D in the circumferential direction. The radially inner edges 162a and 162b are also positioned to be axially (or laterally) outboard of their respective radially outer edges 160a and 160b. In this configuration, the transition portions 158a and 158b each tend to generally widen from edges 160 to edges 162, which results in the wide teeth 120 generally widening along the transition portions 158a and 158b.

At the lower (as illustrated in FIGS. 12 and 13) edges 162a and 162b of the transition portions the wide teeth also include inboard and outboard edge surfaces 164a and 164b that extend generally parallel to plane D and away from the edges 162a and 162b in the radial direction. The edge surfaces may have an edge height in the radial direction that is between about 5% and about 15% of the transition height in some embodiments. The wide teeth 120 also include chamfers 168 for clearance and tooth top land face 170.

In this example, the transition portions 158a and 158b are configured to be the portion of the wide teeth 120 that will contact the chain if it becomes misaligned and may help urge the chain back into lateral alignment with the chainring 100. Preferably, the transition portions 158a and 158b are configured so that while the generally widen from the tip 132 toward the root 128 they widen more gradually than conventional chainring teeth so that a width 142 of the wide teeth 120 measured in plane A (FIG. 11) is less than about 80% of the wide link width 60, and may be between about 70-75% of the width 60. Preferably, the plane A is located at a height 172 that can be between about 40% and about 60% of the tooth height 134, and in the illustrated example is approximately 50% of the tooth height 134.

Referring to FIGS. 11 and 12, in this arrangement the chamfers 26 and 46 of the outer chain links 22 and 42 may tend to contact and slide along the transition portions 158a or 158b (depending on the direction of misalignment). Referring to FIG. 13, plane C contains both edge 162a and edge 162b and is generally parallel to axis 104 of chainring 100. When outer link set 20 is fully seated around wide tooth 120, Plane C is spaced above the root by a height 186 that can be between about 5% and 20% of the tooth height 134 and is offset below inner faces 44 and 24 by a distance 184. As such, outboard and inboard faces 134a and 134b do not contact inner faces 44 and 24.

Because of the relatively gradual tapering of the wide teeth 120 the chain 10 may be urged into alignment with the chainring 100 more gradually (e.g. over a relatively larger rotational distance as the chainring rotates) than if the transition portions 158a and 158b widened more quickly (e.g. occupied 80% or more of the link width 60 at plane A). This may help reduce the forces exerted between the chain and the transition portions 158 of the wide teeth 120, which may help reduce wear on the teeth and/or the chain.

In addition, the transition portions 158a and 158 can preferably be configured so that they continue to generally widen below plane A (e.g. radially inward of plane A—toward the root) to a second, wider width 176 that is measured at the lower edges 162a and 162b of the transition zones 158a,b, which lie in and help define a second plane C, positioned between the plane A and the root 128. Optionally, the second plane C may be positioned so that the height 186 is between about 10% and about 30% of the tooth height and may preferably be about 25% of the tooth height 134. In this position the second plane C may be positioned so as to be disposed radially inward and will not intersect opposing active link faces 24 and 44 of the drive chain that bound the wide link spaces 58 when the wide tooth 120 is fully received within a corresponding one of the wide link spaces (FIG. 13).

This width 176 is greater than the width 142 and may preferably be selected to be at least 105%, 110%, 115%, 120%, 125% or more of the width 142. In this configuration, the chain 10 will continued to be urged into alignment with the chainring as it moves inward (downward as illustrated) past the midway point of the teeth 120. Preferably, the width 176 can be set so that it is at least 90% of the wide link width 60, and optionally can be set so that it is between 95-105% of width 60 and may be substantially the same as the wide link width 60. This may help further guide the chain 10 into alignment as it continues to settle onto the teeth 120 as the chainring 100 rotates. Optionally, the width 176 may represent the widest point on the tooth 120, and the tooth 120 then narrow inboard from faces 164a,b to a root width 138 that is less than the width 176 and optionally less than the width 142 and is measured in a plane 180 (FIG. 13) that is parallel to planes A and C.

Figure 27:
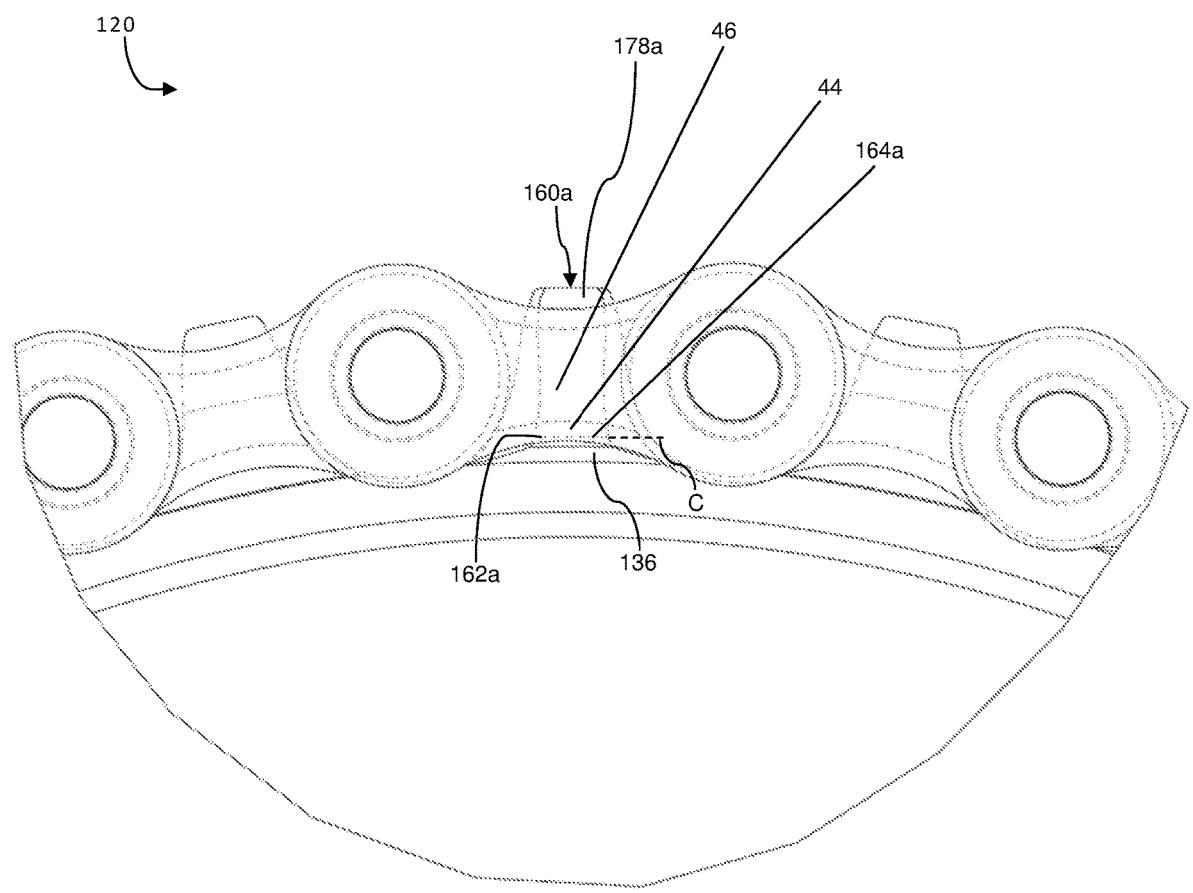
FIG. 27 is side view of a chain seated on the chainring or FIG. 4 with portions of the chain shown in phantom lines.

Referring also to FIG. 27, the location of plane C, and the lower edges 162a and 162b of the transition zones 158a,b is preferably set so that when the chain 10 is fully seated on the chainring 100 as shown in FIG. 13 that the plane C is located radially inward from (below as illustrated in FIGS. 13 and 27) and does not intersect the faces 24 and 44, such that the lower edges 162a and 162b are inward from the faces 24 and 44 as well. This may help reduce the degree of contact/wear between the faces 24 and 44 and the lower edges 162a and 162b and faces 164a,b when the chain 10 is seated on the chainring. In this embodiment, each of the planes A and C are generally orthogonal to the radial direction and are positioned so that they lie radially within and intersect the transition portions 158a and 158b of the wide tooth 120, and plane C can help define the radially inner boundary of the transition portions 158.

Preferably, the transition portions 158 may be configured to include a single, continuous surface that extends between the outer and inner edges 160 and 162. This surface would provide the generally continuously widening contact surface of the transition zones 158 and may be free from intervening edges, corners or other such features that may tend to wear faster when contacted by the chain 10. Optionally, such a transition surface may be configured to generally match the profile of the associated link faces 22 and 42, and may be flat, planar surfaces that are inclined relative to the plane D. Alternatively, the transitions surfaces may be configured as curved, arcuate surfaces that curve between the edges 160 and 162 but are configured such that tangents to the surfaces are generally parallel to the edge direction and plane D. The curved surfaces may optionally be configured as generally convex, fillet surfaces and optionally may have a generally constant radius of curvature. In yet other alternative embodiments, the transition portions may include two or more transition surfaces that may have different orientations but are preferably arranged so that the teeth generally widen along within the transition portions.

Figure 5:
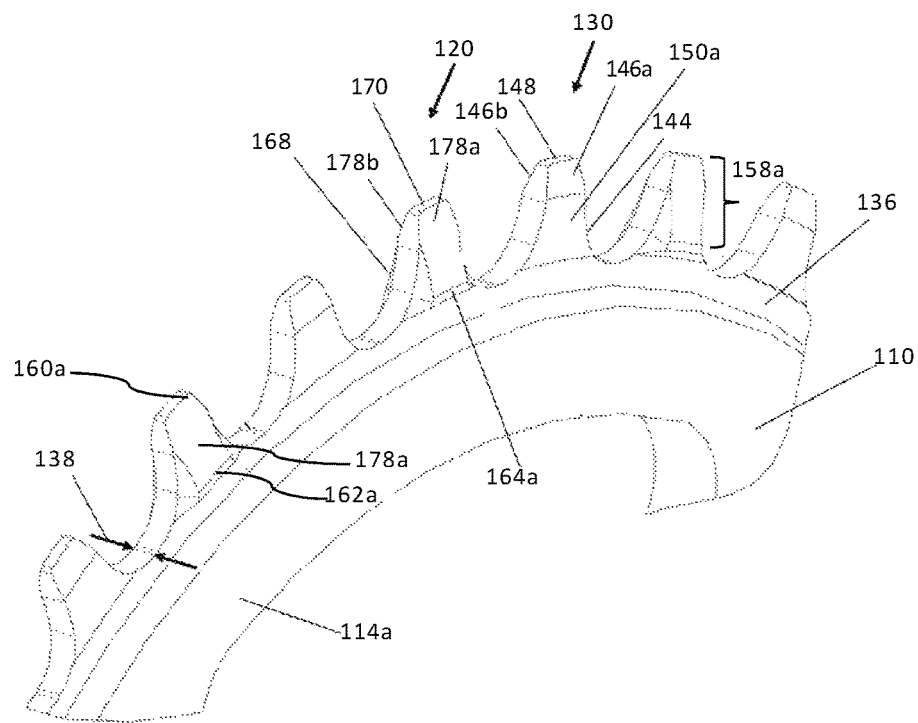
FIG. 5 is an enlarged view of a portion of the chainring of FIG. 4.

Referring to FIGS. 5, 12 and 13, the transition portions 158a,b of the wide teeth 120 in the present example each include a single, substantially planar transition surface 178a and 178b that is configured as a chamfer surface which extends continuously between the edges 160a,b and 162a,b. These surfaces 178a and 178b are preferably relatively smooth to help facilitate sliding of the chain 10 and are inclined relative to the plane D such that they converge toward the tip 132 and generally widen toward the root 128. In this example, as shown in FIG. 12 when the chain is misaligned the chamfer 26 may in sliding contact with outboard wide tooth chamfer surface 178a. The chamfer 26 can then slide down outboard wide tooth chamfer 178a and the inboard outer link plate 42 can move closer to chainring center plane D, thereby aligning outer link set 20 to chainring 100 as the chainring rotates (see FIG. 13).

Figure 6:
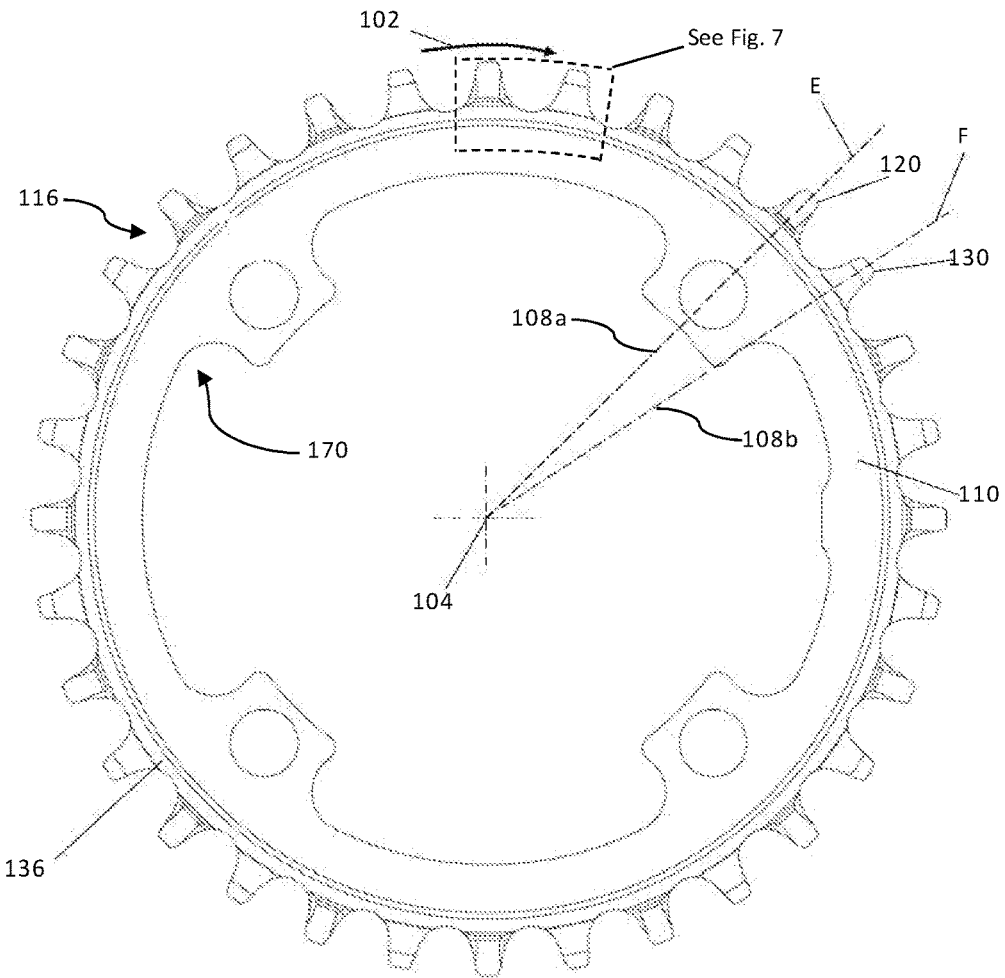
FIG. 6 is a side view of the chainring of FIG. 4.
Figure 7:
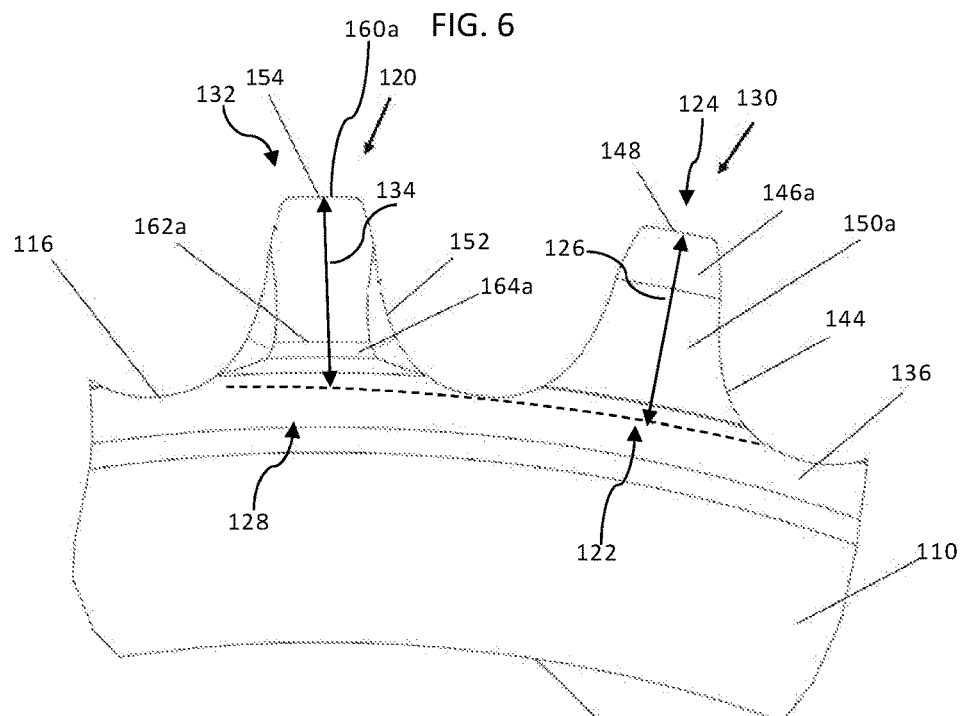
FIG. 7 is an enlarged view of a portion of FIG. 6.
Figures 8, 9:
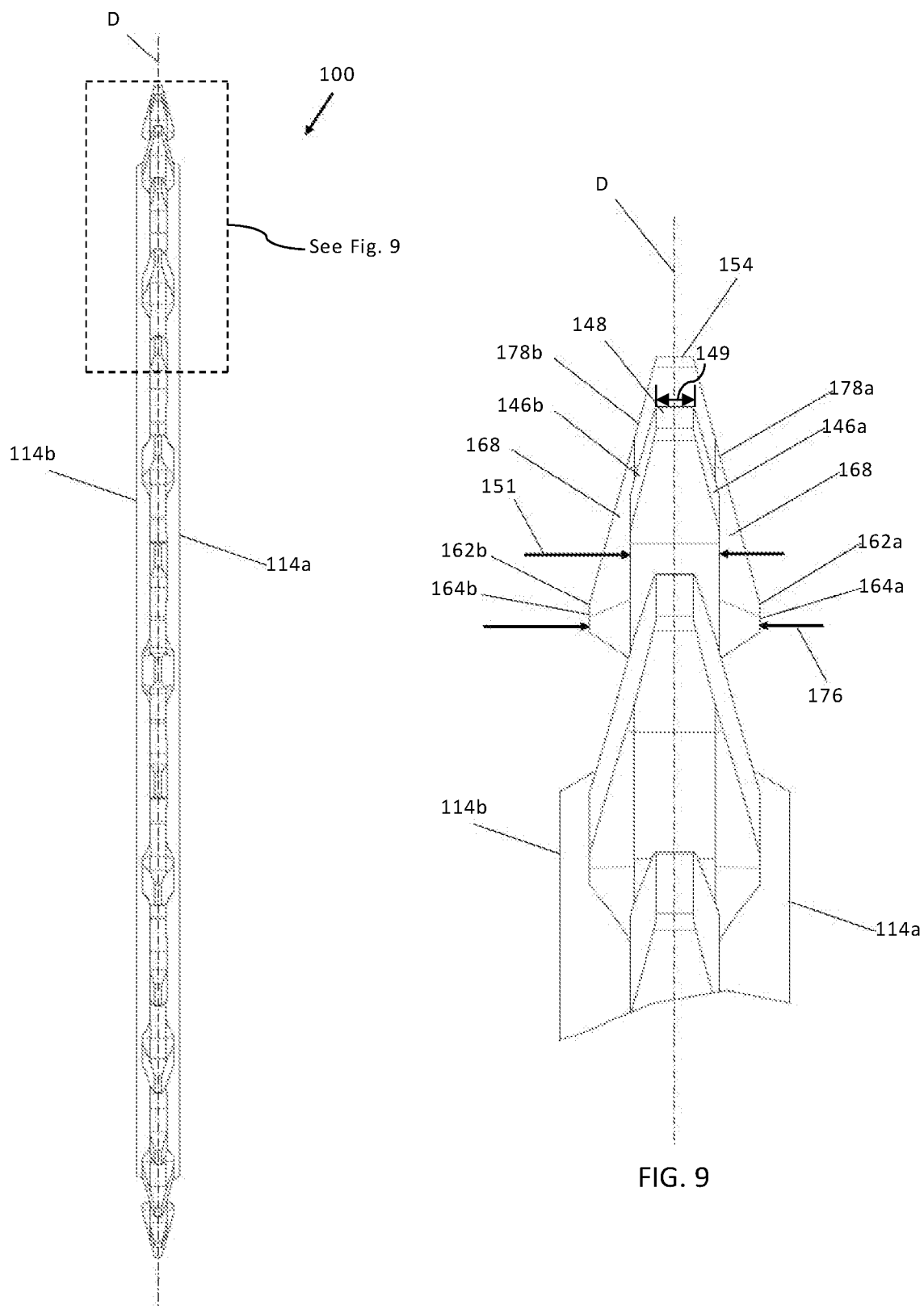
FIG. 8 is a front view of the chainring of FIG. 4.
FIG. 9 is an enlarged view of a portion of FIG. 8.

Optionally, the chainring 100 may be configured so that it is generally symmetrical around plane D. Referring now to FIG. 6, a radially extending plane E bisects top land 126 (see FIG. 7) of wide tooth 120. Wide tooth 120 in this example is symmetric about plane E. A radially extending plane F bisects top land 136 (see FIG. 7) of narrow tooth 130.

Narrow tooth 130 in this example is symmetric about plane F in the direction of rotation 102.

Referring to FIGS. 14-23, another example of a chainring 1100 that is compatible with the drive chain 10 is shown. Chainring 1100 is generally similar to chainring 100 with like features being annotated using like reference characters indexed by 1000. When mounted to bicycle and the crankset is pedaled chainring 1100 is configured so that it will rotate in a rotation direction 102 (shown as clockwise in FIG. 14, but which could also be counter clockwise) about a rotation axis 1104.

In this example, the chainring 1100 includes body 1110 and a mounting portion 1112 that is configured to be connected to a bicycle. The body surrounds and is rotatable about the rotation axis 1104 and helps define the plane D (FIG. 19) that is shown as being in the middle of the body 1110 in the axial direction (i.e. parallel to rotation axis 1104). For the purposes of discussion, the chainring 1100 is described has having an outboard chainring face 1114a and an opposing inboard chainring face 1114b but it is understood that this orientation could be reversed if the chainring is connect to a bicycle in a different orientation.

In this example, the mounting portion 1112 includes a central mounting aperture 1180 instead of the plurality of spaced apart mounting apertures 105a-105d. The aperture 1180 is configured to be connected to a corresponding attachment portion on a bicycle crank set. In other examples the mounting portion 1112 may have a different configuration.

The chainring 1100 also includes a periphery portion that surrounds the rotation axis 1104. The periphery portion in the illustrated example includes an outer or root periphery region 1116 and an inner periphery region 1170 that is radially in inboard from the periphery region 1116. A plurality of teeth extend generally radially outwardly from the outer periphery region 1116, including a plurality of wide teeth 1120 arranged in an alternating manner with a plurality of relatively narrow teeth 1130. In this example, the narrow teeth 1130 all have substantially the same shape as each other, as do the wide teeth 1120.

In this example, the narrow teeth 1130 are generally similar to the narrow teeth 130 but are configured so that top land surface 1142 is smaller than top land surface 142, and tip width 1156 is less than tip width 156. The narrow teeth 1130 extend from respective roots 1122 that are proximate the body 1110 to respective tips 1124 that are spaced apart from the roots 1122 by a tooth height 1126.

The wide teeth 1120 also extend from respective roots 1128 proximate the body 1110 to respective tips 1132 that are spaced from the roots 1128 by the wide tooth height 1134. In the illustrated example the heights 1126 and 1134 are substantially equal, but in other examples may differ. Also, in this example the roots 1122 and 1128 of all of both types of teeth 1120 and 1130 lie along a common root groove 1136 that is formed on the body 1110 such that the roots 1122 and 1128 have substantially the same root width in the axial direction, one example of which is shown as root width 1138 in FIG. 22.

Figure 21:
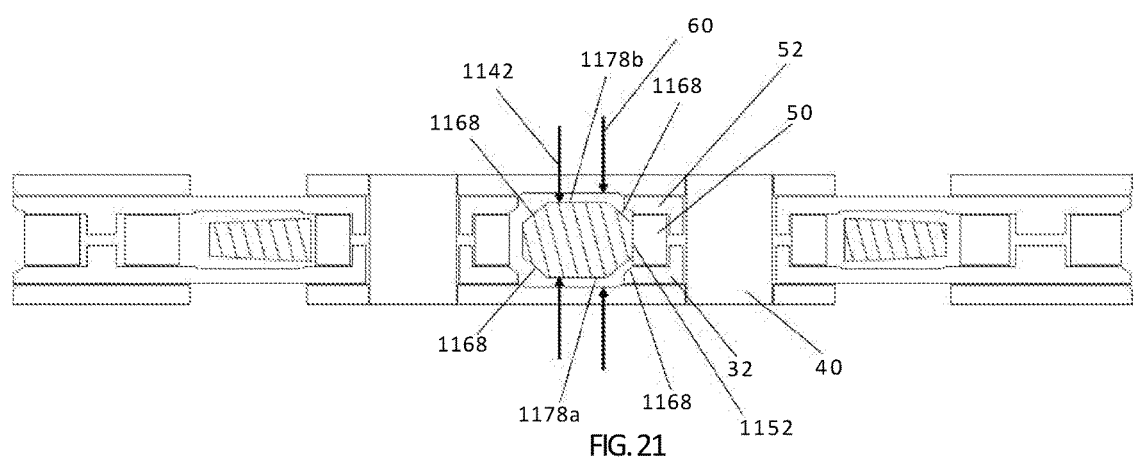
FIG. 21 is a cross-sectional view of the chainring and chain of FIG. 10, taken along line B-B.
Figure 22:
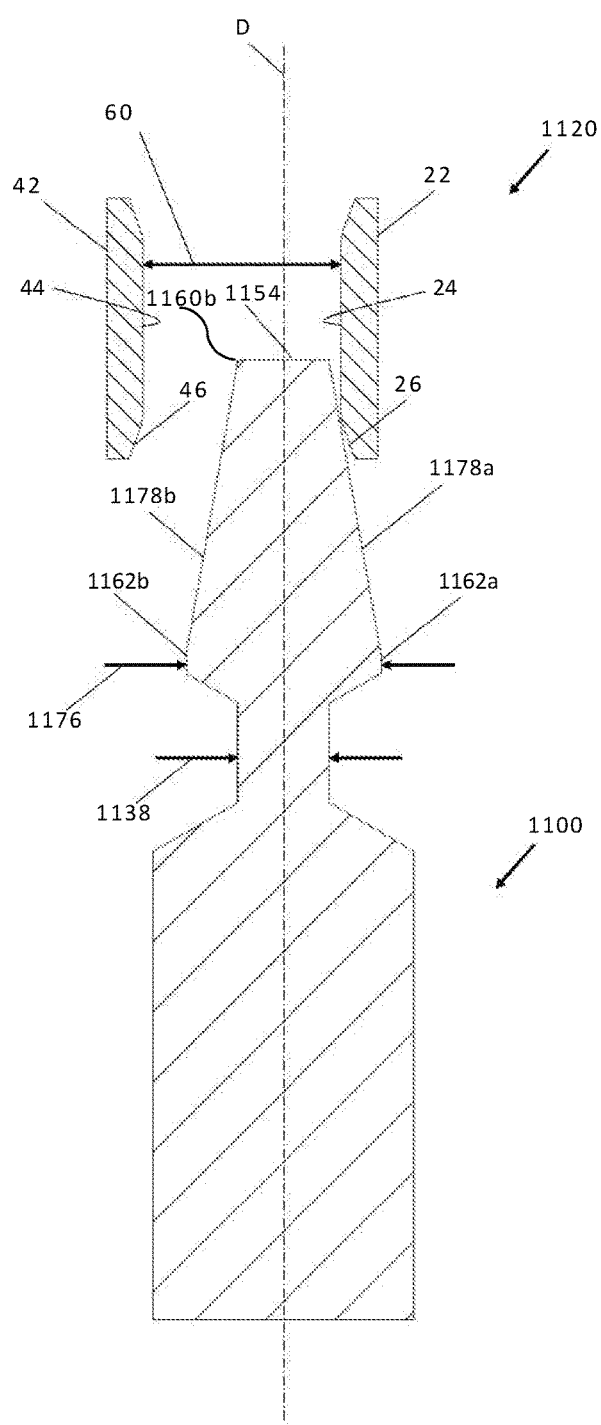
FIG. 22 is a schematic representation of a cross-sectional view of a portion of the chainring of FIG. 14 showing the drive chain partially engaged.
Figure 23:
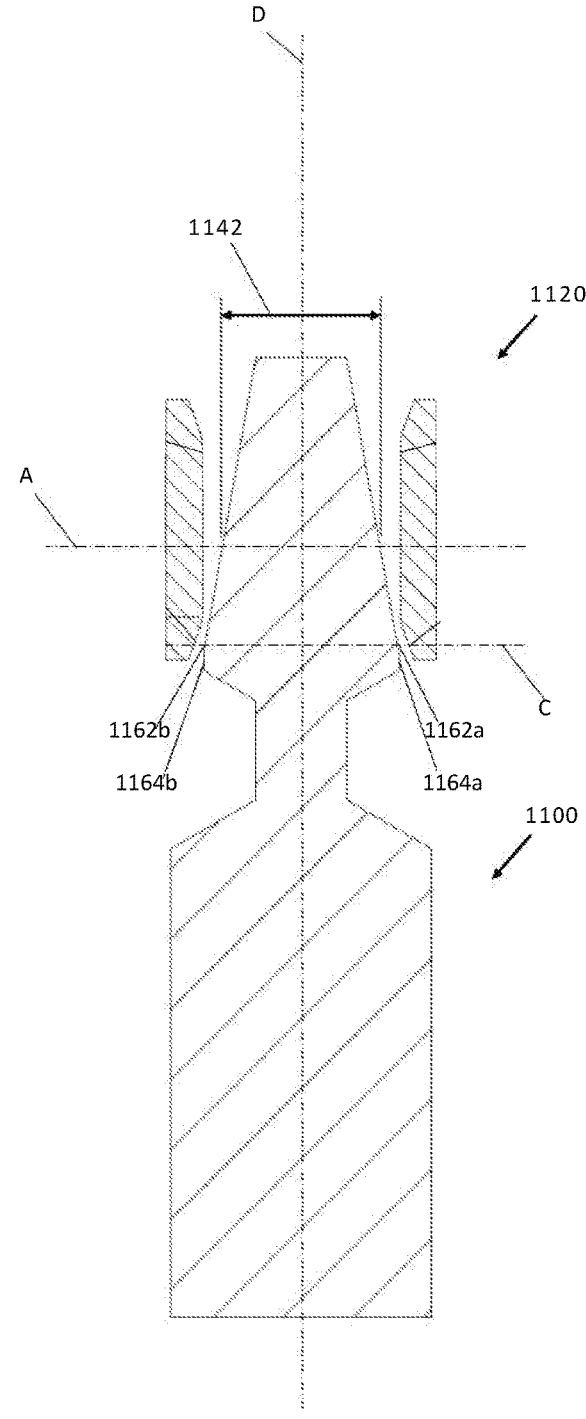
FIG. 23 is a schematic representation of a cross-sectional view of a portion of the chainring of FIG. 14 showing the drive chain engaged.

Referring to FIGS. 21-23, in this example, the wide teeth 1120 include respective drive faces 1152 for driving adjacent rollers 50 when in use and have a generally radially outwardly facing top land face 1154 at is located at the tip 1132 and defines a tip width 1156 (FIG. 22). In this example, the tip width 1156 is different (and greater than) than the tip width 1149 of the narrow teeth 1130.

The wide teeth 1120 also include inboard and outboard transition portions 158a and 158b that extend from respective first or radially outer edges 1160a and 1160b to second or radially inner edges 1162a and 1162b and that tend to generally widen from edges 1160 to edges 1162, which results in the wide teeth 1120 generally widening along the transition portions 1158a and 1158b.

At the lower (as illustrated in FIGS. 22 and 23) edges 1162a and 1162b of the transition portions the wide teeth also include inboard and outboard edge surfaces 1164a and 1164b and chamfers 1168 for clearance and a tooth top land face 1170.

In this example, the transition portions 1158a and 1158b are configured so that while the generally widen from the tip 1132 toward the root 1128 they widen more gradually than conventional chainring teeth so that a width 1142 of the wide teeth 1120 measured in plane A (FIG. 21) is less than about 80% of the wide link width 60, and may be between about 70-75% of the width 60. Preferably, the plane A is located at a height 1172 that can be between about 40% and about 60% of the tooth height 1134, and in the illustrated example is approximately 50% of the tooth height 1134.

Referring to FIGS. 21 and 22, in this arrangement the chamfers 26 and 46 of the outer chain links 22 and 42 may tend to contact and slide along the transition portions 1158a or 1158b (depending on the direction of misalignment). Referring to FIG. 23, plane C contains both edge 1162a and edge 1162b and is generally parallel to axis 1104 of chainring 1100. When outer link set 20 is fully seated around wide tooth 1120, Plane C is spaced above the root by a height 1186 that can be between about 5% and 20% of the tooth height 1134 and is offset below inner faces 44 and 24 by a distance 1184. As such, outboard and inboard faces 1134a and 1134b do not contact inner faces 44 and 24.

In this example the transition portions 1158a and 1158 are configured so that they continue to generally widen below plane A (e.g. radially inward of plane A—toward the root) to a second, wider width 1176 that is measured at the lower edges 1162a and 1162b of the transition portions 1158a,b, which lie in and help define a second plane C, positioned between the plane A and the root 1128.

In this embodiment, this width 1176 is greater than the width 1142 and may preferably be selected to be at least 105%, 110%, 115%, 120%, 125% or more of the width 1142. In this configuration, the chain 10 will continued to be urged into alignment with the chainring as it moves inward (downward as illustrated) past the midway point of the teeth 1120. Preferably, the width 1176 can be set so that it is at least 90% of the wide link width 60, and optionally can be set so that it is between 95-105% of width 60 and may be substantially the same as the wide link width 60. This may help further guide the chain 10 into alignment as it continues to settle onto the teeth 1120 as the chainring 100 rotates. Optionally, the width 1176 may represent the widest point on the tooth 120, and the tooth 1120 then narrow inboard from faces 1164a,b to a root width 1138 that is less than the width 1176 and optionally less than the width 1142.

Figure 15:
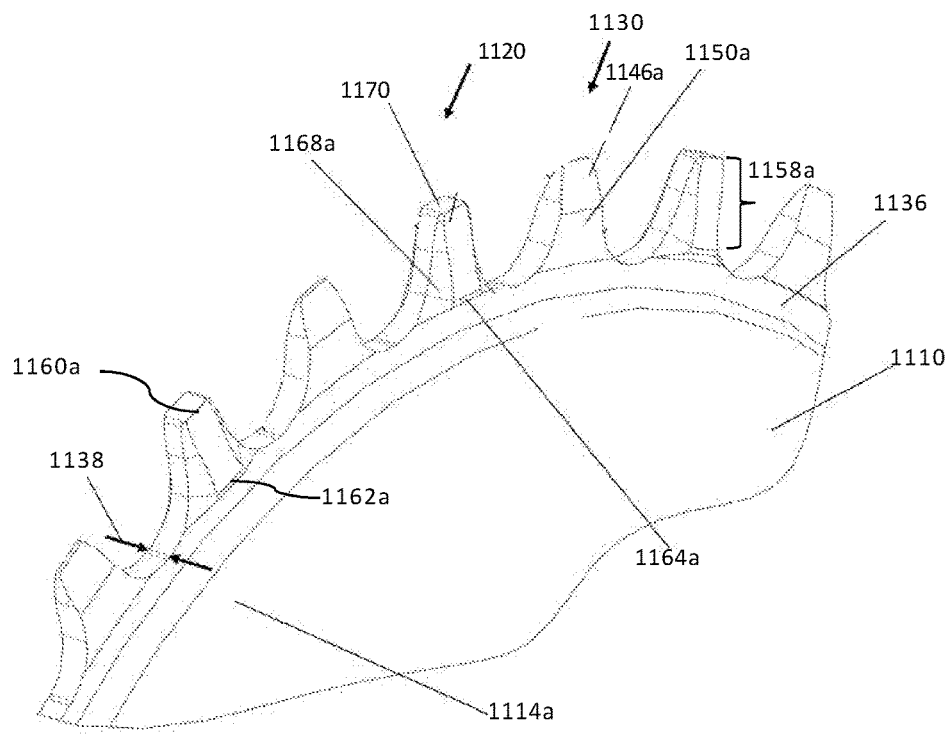
FIG. 15 is an enlarged view of a portion of the chainring of FIG. 14.
Figure 16:
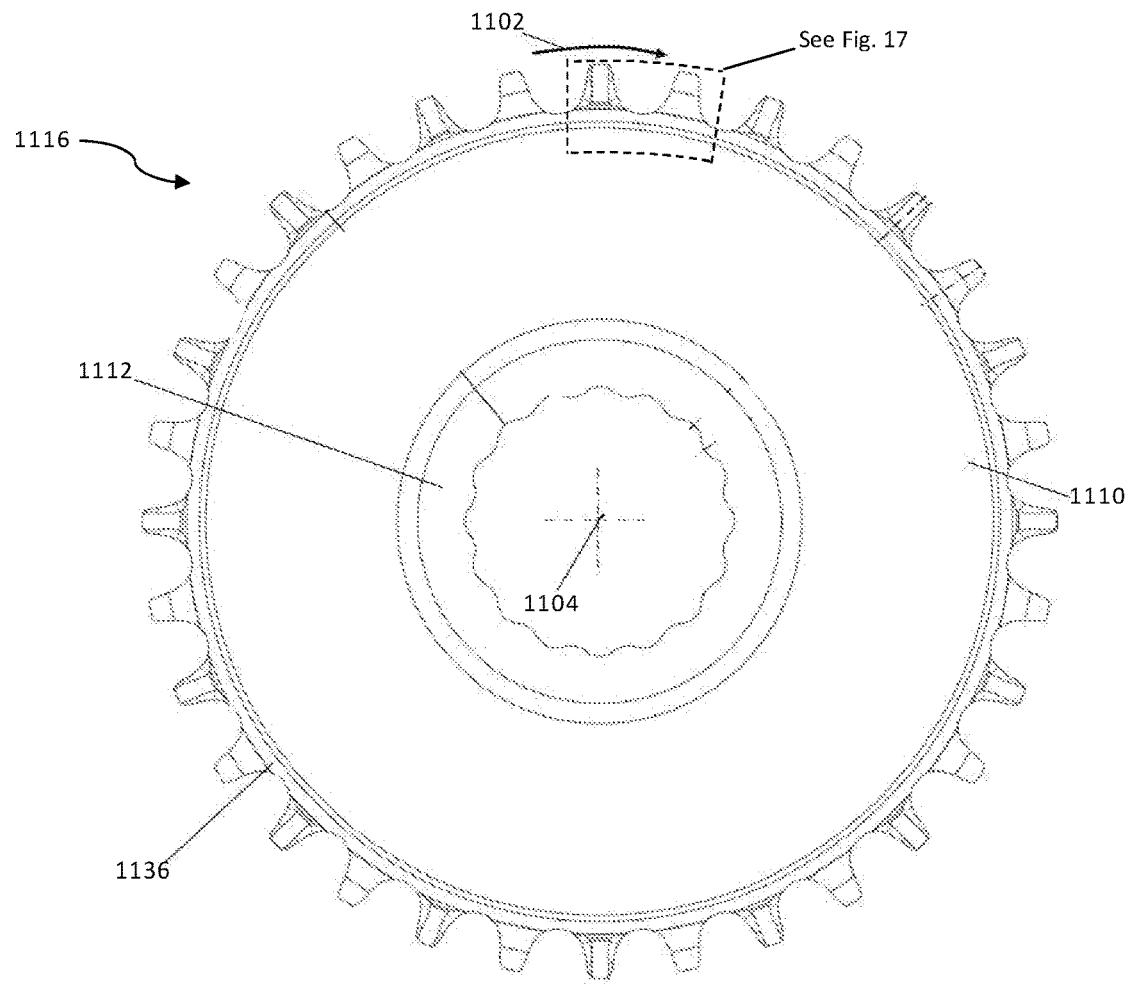
FIG. 16 is a side view of the chainring of FIG. 14.
Figure 17:
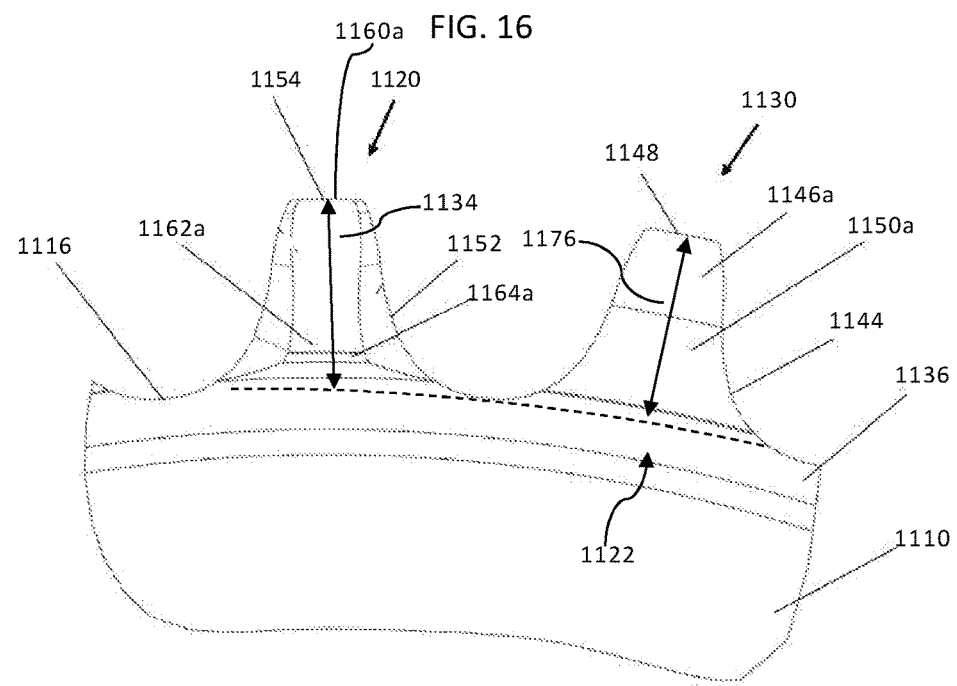
FIG. 17 is an enlarged view of a portion of FIG. 16.
Figure 20:
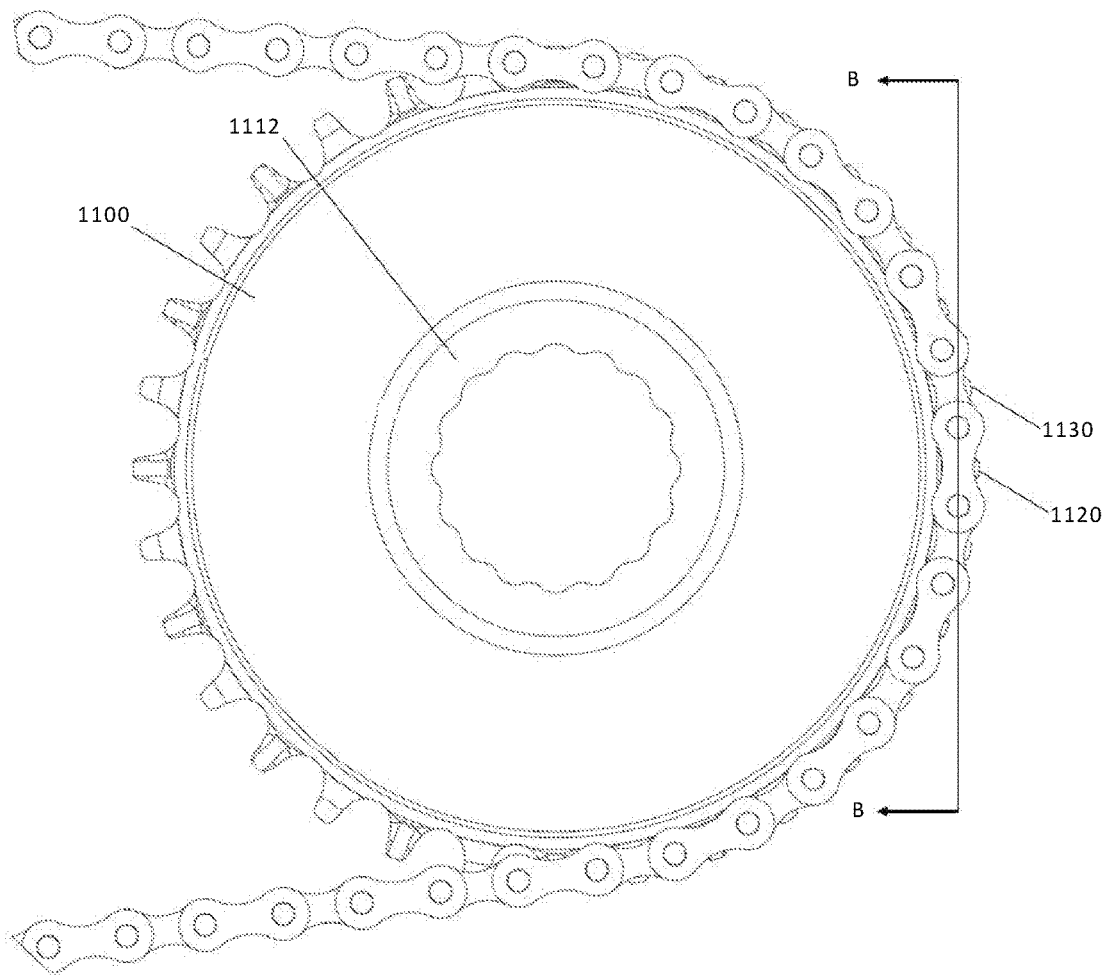
FIG. 20 is a side view of the chainring of FIG. 4 engage with a drive chain.

Referring to FIGS. 15, 22 and 23, the transition portions 1158a,b of the wide teeth 11120 in the present example each include a single, substantially planar transition surface 1178a and 1178b that is configured as a chamfer surface which extends continuously between the edges 1160a,b and 1162a,b.

Figure 24:
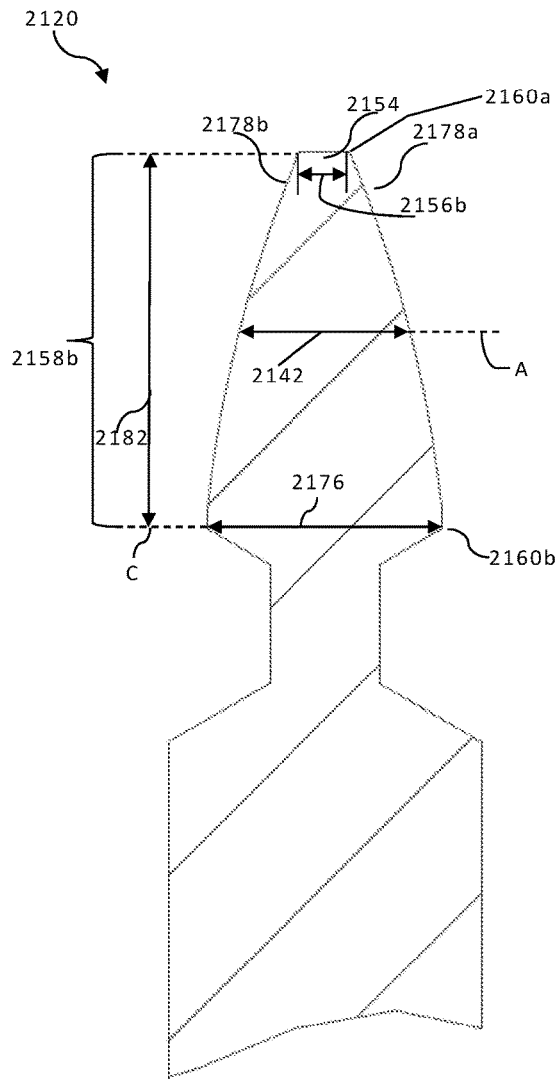
FIG. 24 is a cross-sectional view of another example of a wide tooth for a chainring.

Referring to FIG. 24, a schematic representation of another example of a width tooth 2120 that can be used with the chainrings and chains described herein. The tooth 2120 is generally similar to the wide tooth 120 and like features are annotated using like reference characters indexed by 2000. In this embodiment the transitions surfaces 2178a and 2178b are configured as arcuate, fillet surfaces instead of planar, chamfer surfaces.

Figure 25:
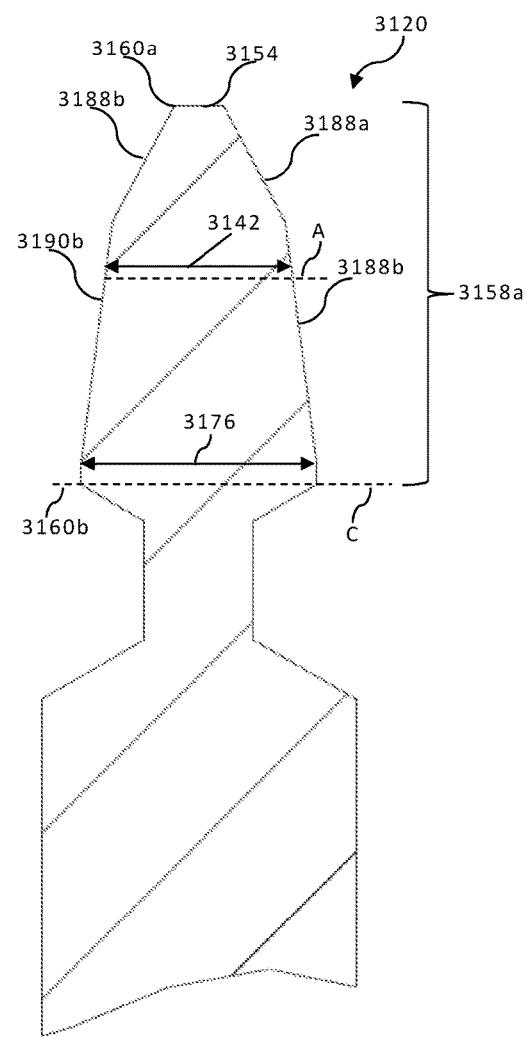
FIG. 25 is a cross-sectional view of another example of a wide tooth for a chainring.

Referring to FIG. 25, a schematic representation of another example of a width tooth 3120 that can be used with the chainrings and chains described herein. The tooth 3120 is generally similar to the wide tooth 120 and like features are annotated using like reference characters indexed by 3000. In this embodiment the transition portions 3158a includes two transition surfaces 3188a and 3190a instead of a single continuous surface 178a. The transition surfaces 3188a and 3190a are each configured as flat, planar surfaces that are inclined relative to the central plane D and to each other. The transition portion 3158b has a matching configuration.

Figure 26:
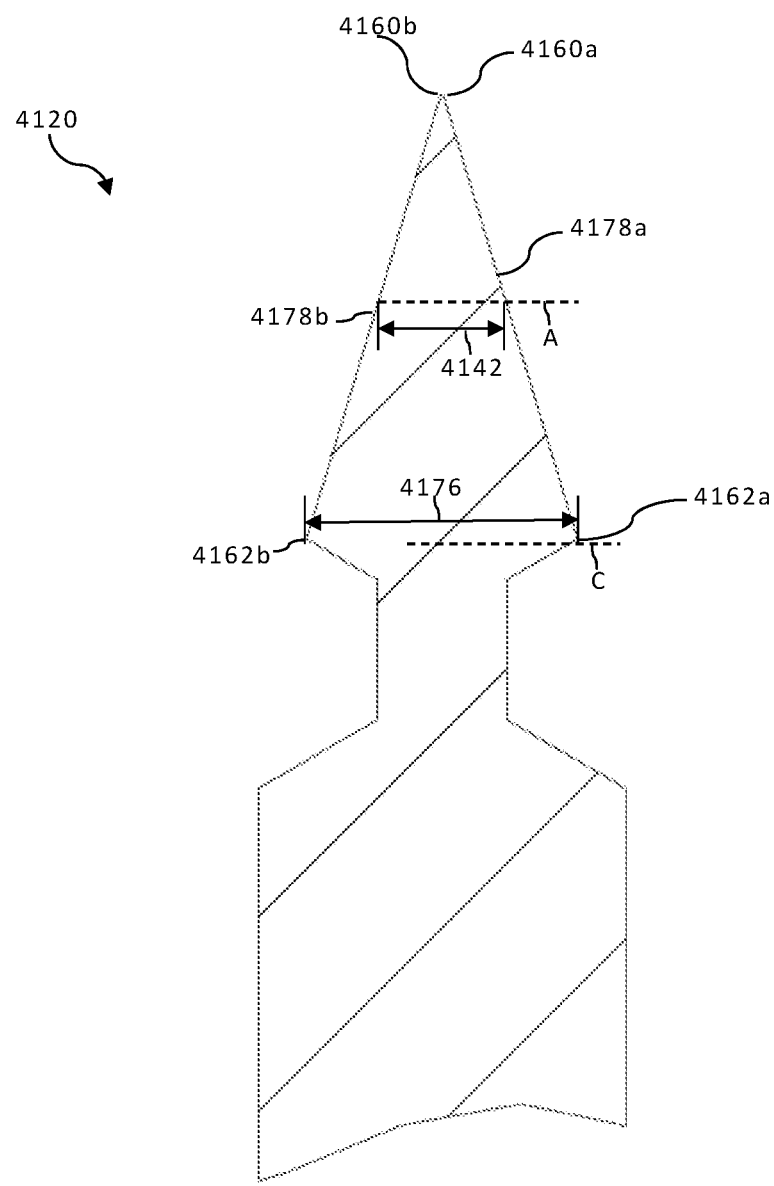
FIG. 26 is a cross-sectional view of another example of a wide tooth for a chainring.

Referring to FIG. 26, a schematic representation of another example of a width tooth 4120 that can be used with the chainrings and chains described herein. The tooth 4120 is generally similar to the wide tooth 120 and like features are annotated using like reference characters indexed by 4000. In this embodiment the transitions surfaces 4178a and 4178b are configured as planar, chamfer surfaces that converge to a relatively sharp point at the tooth tip 4132 such that there is no material top land surface in this example, and the tip width can be understood to be small and possibly be represented as an edge at the interface between the surfaces 4178a and 4178b.

I claim:

1. A bicycle chainring for engagement with a drive chain having alternating narrow link spaces and wide link spaces, the chainring comprising:
   a) a body having a mounting portion configured to be connected to a bicycle and a periphery, the body being rotatable about a drive axis when connected to the bicycle and defining a central plane that is orthogonal to the drive axis;
   b) a plurality of first teeth spaced apart from each other around the periphery, extending radially outwardly from the periphery and configured to fit within the narrow link spaces in the drive chain;
   c) a plurality of second teeth disposed alternatingly between adjacent ones of the first teeth around the periphery and configured to fit within the wide link spaces in the drive chain, each second tooth extending radially from a root adjacent the periphery to a tip that is spaced from the root by a tooth height and has a tip width in the axial direction, each second tooth having:
      i. a first width that is greater than the tip width and is measured orthogonally to the radial direction in a first plane that is disposed between about 40% and about 60% of the tooth height and; and
      ii. a second width that is greater than the first width and is measured orthogonally to the radial direction in a second plane that is disposed radially between the first plane and the root; and
      iii. a first transition portion on a first side of the second tooth that is at least partially bounded by and extends between a first edge that is at the tip and extends in an edge direction that is substantially parallel to the central plane and a second edge that is disposed at the second plane and extends in the edge direction, the first and second planes intersecting the first transition portion.

2. The bicycle chainring of claim 1, wherein each second tooth further comprises a second transition portion on an opposing second side of the second tooth that is at least partially bounded by and extends between a first edge that is at the tip and extends in the edge direction and a second edge that is disposed at the second plane and extends in the edge direction, the first and second planes intersecting the second transition portion.

3. The bicycle chainring of claim 1, wherein the first plane is disposed at about 50% of the tooth height.

4. The bicycle chainring of claim 1, wherein the first width is less than about 80% of a width of the wide link spaces.

5. The bicycle chainring of claim 1, wherein the second width is at least 110% of the first width.

6. The bicycle chainring of claim 1, wherein each second tooth is configured so that the second width is between about 95% and about 105% of a width of the wide link spaces.

7. The bicycle chainring of claim 1, wherein the second plane is positioned so that the second plane is disposed radially below and does not intersect opposing active link surface faces of the drive chain that bound the wide link spaces when the second tooth is fully received within a corresponding one of the wide link spaces.

8. The bicycle chainring of claim 1, wherein each second tooth generally widens from the tip to the second plane.

9. The bicycle chainring of claim 1, wherein the first transition portion comprises a first transition surface that extends continuously between the first edge and the first plane.

10. The bicycle chainring of claim 9, wherein the first transition surface extends continuously between the first edge and the second plane.

11. The bicycle chainring of claim 10, wherein the first transition surface comprises a first chamfer surface and is substantially planar and inclined relative to the central plane.

12. The bicycle chainring of claim 9, wherein the first side of each second tooth further comprises a first edge surface intersecting with the second edge of the first transition portion and extending away from the first transition portion and parallel to the central plane.

13. A bicycle chainring for engagement with a drive chain having alternating narrow link spaces and wide link spaces, the chainring comprising:
   a) a body having a mounting portion configured to be connected to a bicycle and a periphery, the body being rotatable about a drive axis when connected to the bicycle;
   b) a plurality of first teeth spaced apart from each other around the periphery, extending radially outwardly from the periphery and configured to fit within the narrow link spaces in the drive chain;
   c) a plurality of second teeth disposed alternatingly between adjacent ones of the first teeth around the periphery and configured to fit within the wide link spaces in the drive chain, each second tooth extending radially from a root adjacent the periphery to a tip that is spaced from the root by a tooth height and has a tip width in the axial direction, each second tooth having:
      i. a first width measured orthogonally to the radial direction in a first plane that is disposed between about 40% and about 60% of the tooth height and that is greater than the tip width and is less than 80% of a link width of the wide link spaces; and
      ii. a second width measured orthogonally to the radial direction in a second plane that is disposed radially between the first plane and the root and that is at least 95% of the link width.

14. The bicycle chainring of claim 13, wherein each second tooth further comprises a first transition portion on a first side of the second tooth that is at least partially bounded by and extends between a first edge that is at the tip and extends in an edge direction that is substantially parallel to the central plane and a second edge that is disposed at the second plane and extends in the edge direction, the first and second planes intersecting the first transition portion and wherein each second tooth further comprises a second transition portion on an opposing second side of the second tooth that is at least partially bounded by and extends between a first edge that is at the tip and extends in the edge direction and a second edge that is disposed at the second plane and extends in the edge direction, the first and second planes intersecting the second transition portion.

15. The bicycle chainring of claim 13, wherein the second width is at least 110% of the first width.

16. The bicycle chainring of claim 13, wherein each second tooth is configured so that the second width is between about 95% and about 105% of a width of the wide link spaces.

17. The bicycle chainring of claim 14, wherein the first transition portion comprises a first chamfer surface that is substantially planar and inclined relative to the central plane and that extends continuously between the tip and the second plane.

18. A bicycle chainring for engagement with a drive chain having alternating narrow link spaces and wide link spaces, the chainring comprising:
a) a body having a mounting portion configured to be connected to a bicycle and a periphery, the body being rotatable about a drive axis when connected to the bicycle;
b) a plurality of first teeth spaced apart from each other around the periphery, extending radially outwardly from the periphery and configured to fit within the narrow link spaces in the drive chain;
c) a plurality of second teeth disposed alternatingly between adjacent ones of the first teeth around the periphery and configured to fit within the wide link spaces in the drive chain, each second tooth extending radially from a root adjacent the periphery to a tip that is spaced from the root by a tooth height and has a tip width in the axial direction, each second tooth having:
i. a first width measured orthogonally to the radial direction in a first plane that is disposed at about 50% of the tooth height and that is greater than the tip width; and
ii. a second width measured orthogonally to the radial direction in a second plane that is disposed radially between the first plane and the root and is disposed radially below and does not intersect opposing active link surface faces of the drive chain that bound the wide link spaces when the second tooth is fully received within a respective one of the wide link spaces, the second width being greater than the first width;
wherein each second tooth widens continuously from the tip to the second plane.

19. The bicycle chainring of claim 18, a first transition portion on a first side of the second tooth that is at least partially bounded by and extends between a first edge that is at the tip and extends in an edge direction that is substantially parallel to the central plane and a second edge that is disposed at the second plane and extends in the edge direction, the first and second planes intersecting the first transition portion.

20. The bicycle chainring of claim 19, further a second transition portion on an opposing second side of the second tooth that is at least partially bounded by and extends between a first edge that is at the tip and extends in the edge direction and a second edge that is disposed at the second plane and extends in the edge direction, the first and second planes intersecting the second transition portion.

* * * * *